US012572374B1

(12) United States Patent (10) Patent No.: US 12,572,374 B1
Tiwari et al. (45) Date of Patent: Mar. 10, 2026

(54) SYSTEM AND METHOD OF OBJECTIVE-DRIVEN INTELLIGENT NAVIGATION

(71) Applicant: Blue Yonder Group, Inc., Scottsdale, AZ (US)

(72) Inventors: Mayank Tiwari, Serilingampalle (IN); Pankaj Rathoure, Hyderabad (IN); Anirban Bhattacharyya, Ammenpur (IN); Santosh Kumar, Jharkhand (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

(21) Appl. No.: 17/892,733

(22) Filed: Aug. 22, 2022

Related U.S. Application Data

(60) Provisional application No. 63/236,100, filed on Aug. 23, 2021, provisional application No. 63/236,099, filed on Aug. 23, 2021.

(51) Int. Cl.
*G06F 9/451* (2018.01)
*G06F 16/958* (2019.01)
*G06F 40/20* (2020.01)

(52) U.S. Cl.
CPC ............ *G06F 9/453* (2018.02); *G06F 16/958* (2019.01); *G06F 40/20* (2020.01)

(58) Field of Classification Search
CPC ...... G06F 9/453; G06F 3/04883; G06F 40/20; G06F 3/013; G06F 3/0481; G06F 1/3206; G06F 3/0346; G06F 3/011; G06F 3/04815; G06F 1/3212; G06F 1/163;
G06F 3/0482; G06F 1/3287; G06F 3/017; G06F 40/30; G06F 16/35; G06F 16/3344; G06F 16/958; G06N 5/022; G06N 20/00; G06N 3/098; G06N 5/046; G06N 3/084; G06T 19/20; G06T 2219/2004; H04L 51/216; H04L 12/185
See application file for complete search history.

(56) References Cited

U.S. PATENT DOCUMENTS

| | | | | |
|---|---|---|---|---|
| 7,702,675 | B1 * | 4/2010 | Khosla | .................... H04L 67/55 |
| | | | | 707/731 |
| 10,929,485 | B1 * | 2/2021 | Chew | ...................... G06N 20/00 |
| 11,157,847 | B2 * | 10/2021 | Abhinav | ................ G06Q 50/01 |

(Continued)

FOREIGN PATENT DOCUMENTS

| | | | | |
|---|---|---|---|---|
| AU | 2013222010 | A1 * | 3/2014 | ......... G06Q 30/0278 |
| AU | 2014100574 | A4 * | 7/2014 | |

(Continued)

*Primary Examiner* — Steven P Sax
(74) *Attorney, Agent, or Firm* — Spencer Fane LLP; Steven J. Laureanti

(57) ABSTRACT

A system and method are disclosed for predicting recommendations for a user interface. The method includes generating a graphical user interface that receives a conversation-based input from at least one user of a client portal, receiving a user profile and a navigation history for the user, providing the conversation-based input from the user to a natural language processing engine, decoding using the natural language processing engine an intent and slots from the conversation-based input; and generating one or more recommendations based, at least in part, on the intent, the slots, the user profile, and the navigation history.

15 Claims, 22 Drawing Sheets

1800

(56)          References Cited

U.S. PATENT DOCUMENTS

| | | | | |
|---|---|---|---|---|
| 12,175,399 | B2 * | 12/2024 | Beringer | G06Q 10/1097 |
| 2009/0299996 | A1 * | 12/2009 | Yu | G06F 17/16 |
| | | | | 707/999.005 |
| 2011/0307489 | A1 * | 12/2011 | Oliver | G06F 16/953 |
| | | | | 707/E17.083 |
| 2014/0136508 | A1 * | 5/2014 | Lyngbaek | G06F 16/9566 |
| | | | | 707/E17.108 |
| 2016/0196491 | A1 * | 7/2016 | Chandrasekaran | G06F 16/248 |
| | | | | 706/50 |
| 2018/0053119 | A1 * | 2/2018 | Zeng | G06F 40/205 |
| 2018/0054464 | A1 * | 2/2018 | Zhang | H04L 51/02 |
| 2019/0220438 | A1 * | 7/2019 | Pal | G06F 9/5055 |
| 2019/0236132 | A1 * | 8/2019 | Zhu | G06N 20/00 |
| 2019/0324780 | A1 * | 10/2019 | Zhu | H04W 12/08 |
| 2020/0118008 | A1 * | 4/2020 | Alkan | G06N 5/022 |
| 2021/0014569 | A1 * | 1/2021 | Rishea | H04N 21/42204 |
| 2021/0073474 | A1 * | 3/2021 | Sengupta | G06F 40/247 |
| 2021/0272217 | A1 * | 9/2021 | Shu | G06F 18/2136 |
| 2021/0350180 | A1 * | 11/2021 | Oleson | G06F 18/2148 |
| 2021/0374569 | A1 * | 12/2021 | Jezewski | G06N 20/00 |
| 2022/0374605 | A1 * | 11/2022 | Sethi | G06F 3/04883 |

FOREIGN PATENT DOCUMENTS

| | | | | | |
|---|---|---|---|---|---|
| CA | 2828490 | A1 * | 9/2012 | | G06F 17/30867 |
| CA | 2906651 | A1 * | 9/2014 | | G06F 40/00 |
| CA | 3131151 | A1 * | 8/2020 | | G06F 16/24522 |
| CA | 3146559 | A1 * | 1/2021 | | F24F 11/49 |
| CA | 3164413 | A1 * | 7/2021 | | G06F 16/355 |
| CA | 3161179 | C | * | 1/2024 | |
| CN | 103177126 | A | * | 6/2013 | |
| CN | 110019777 | A | * | 7/2019 | G06F 17/30707 |
| CN | 111274493 | B | * | 9/2020 | |
| CN | 113158049 | A | * | 7/2021 | G06F 16/9535 |
| CN | 108446322 | B | * | 3/2022 | G06F 16/3329 |
| CN | 114254085 | A | * | 3/2022 | |
| CN | 119025647 | A | * | 11/2024 | |
| CN | 119377433 | B | * | 4/2025 | |
| CN | 115605861 | B | * | 9/2025 | G06F 16/35 |
| EP | 2428926 | A2 * | 3/2012 | | G06Q 10/101 |
| EP | 2738716 | A2 * | 6/2014 | | G06F 17/18 |
| JP | 5064617 | B2 * | 10/2012 | | H04N 21/4312 |
| JP | 7279005 | B2 * | 5/2023 | | G06F 9/50 |
| KR | 102734282 | B1 * | 11/2024 | | |
| TW | M443894 | U | * | 12/2012 | |
| WO | WO-2017176653 | A1 * | 10/2017 | | G06F 17/30477 |
| WO | WO-2020126868 | A1 * | 6/2020 | | G06F 40/30 |
| WO | WO-2020247111 | A1 * | 12/2020 | | G06F 40/197 |
| WO | WO-2024227132 | A1 * | 10/2024 | | G06F 3/011 |

* cited by examiner

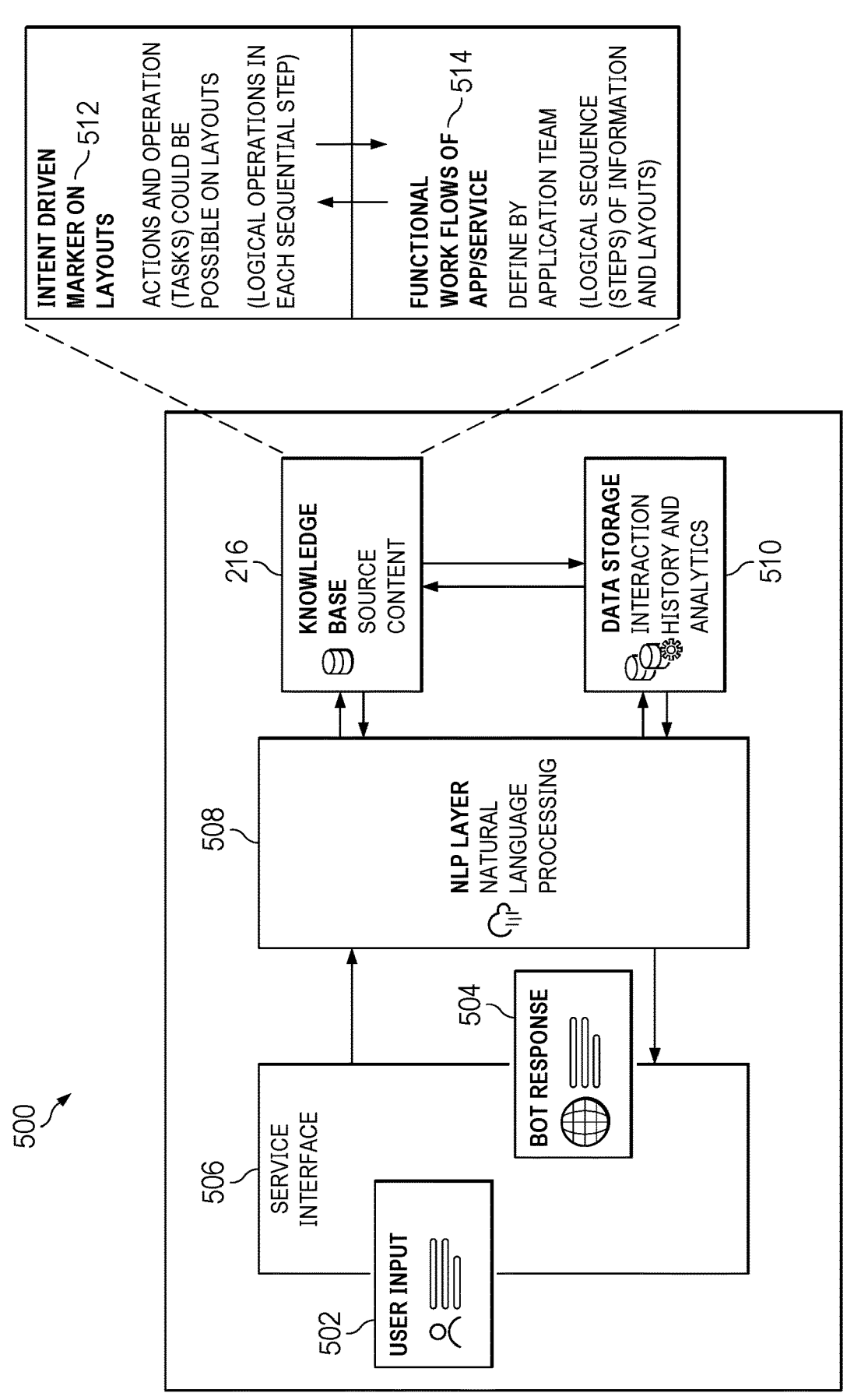

INTENT DRIVEN MARKER ON LAYOUTS ~512

ACTIONS AND OPERATION (TASKS) COULD BE POSSIBLE ON LAYOUTS (LOGICAL OPERATIONS IN EACH SEQUENTIAL STEP)

FUNCTIONAL WORK FLOWS OF APP/SERVICE ~514

DEFINE BY APPLICATION TEAM (LOGICAL SEQUENCE (STEPS) OF INFORMATION AND LAYOUTS)

216

KNOWLEDGE BASE
SOURCE CONTENT

DATA STORAGE
INTERACTION HISTORY AND ANALYTICS

510

508

NLP LAYER
NATURAL LANGUAGE PROCESSING

506

SERVICE INTERFACE

504

BOT RESPONSE

502

USER INPUT

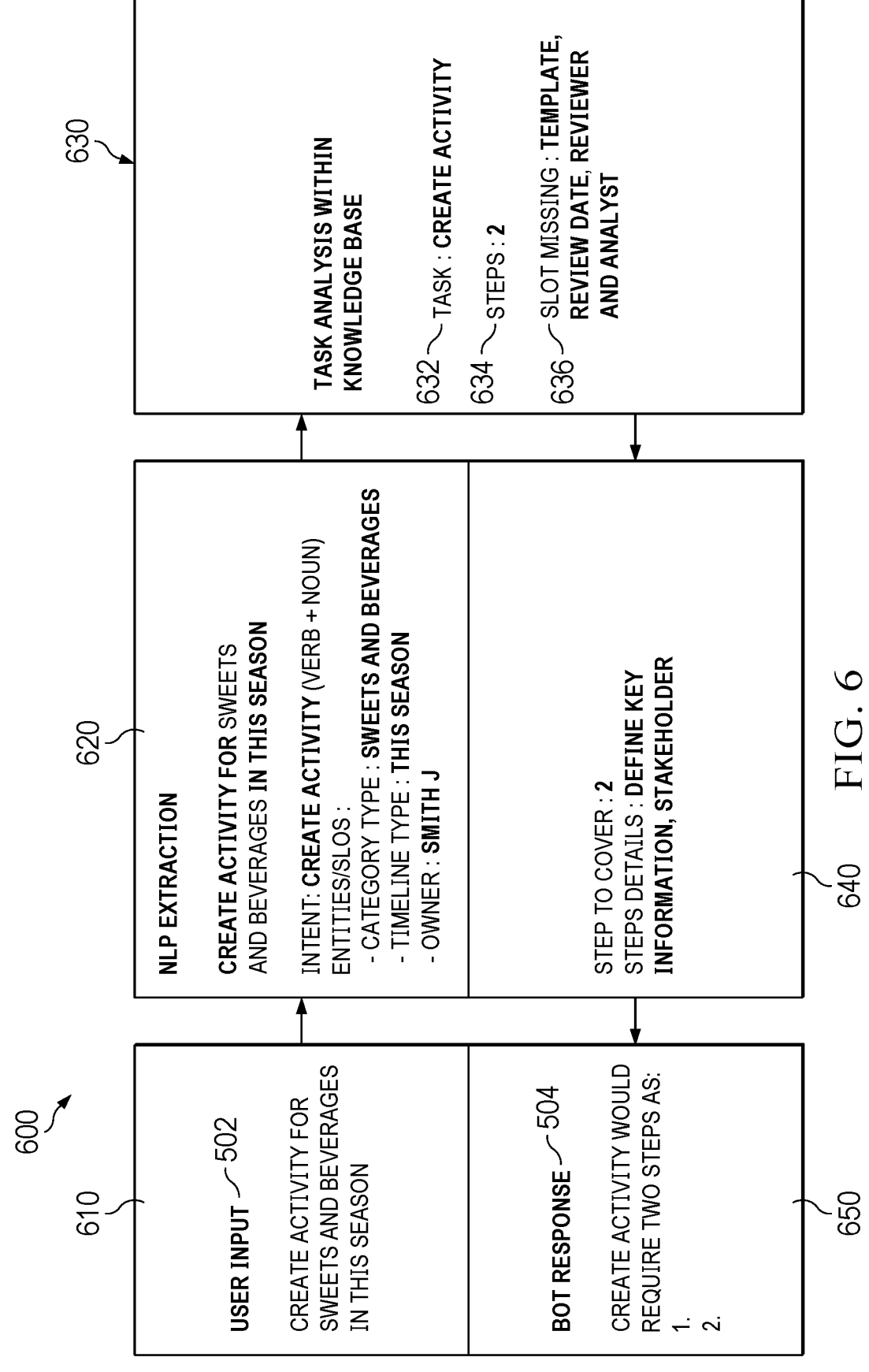

USER INPUT ⁓ 502

CREATE ACTIVITY FOR SWEETS AND BEVERAGES IN THIS SEASON

610

NLP EXTRACTION

CREATE ACTIVITY FOR SWEETS AND BEVERAGES IN THIS SEASON

INTENT: CREATE ACTIVITY (VERB + NOUN)
ENTITIES/SLOS :
- CATEGORY TYPE : SWEETS AND BEVERAGES
- TIMELINE TYPE : THIS SEASON
- OWNER : SMITH J

620

TASK ANALYSIS WITHIN KNOWLEDGE BASE

632 ⁓ TASK : CREATE ACTIVITY

634 ⁓ STEPS : 2

636 ⁓ SLOT MISSING : TEMPLATE, REVIEW DATE, REVIEWER AND ANALYST

630

STEP TO COVER : 2
STEPS DETAILS : DEFINE KEY INFORMATION, STAKEHOLDER

640

BOT RESPONSE ⁓ 504

CREATE ACTIVITY WOULD REQUIRE TWO STEPS AS:
1.
2.

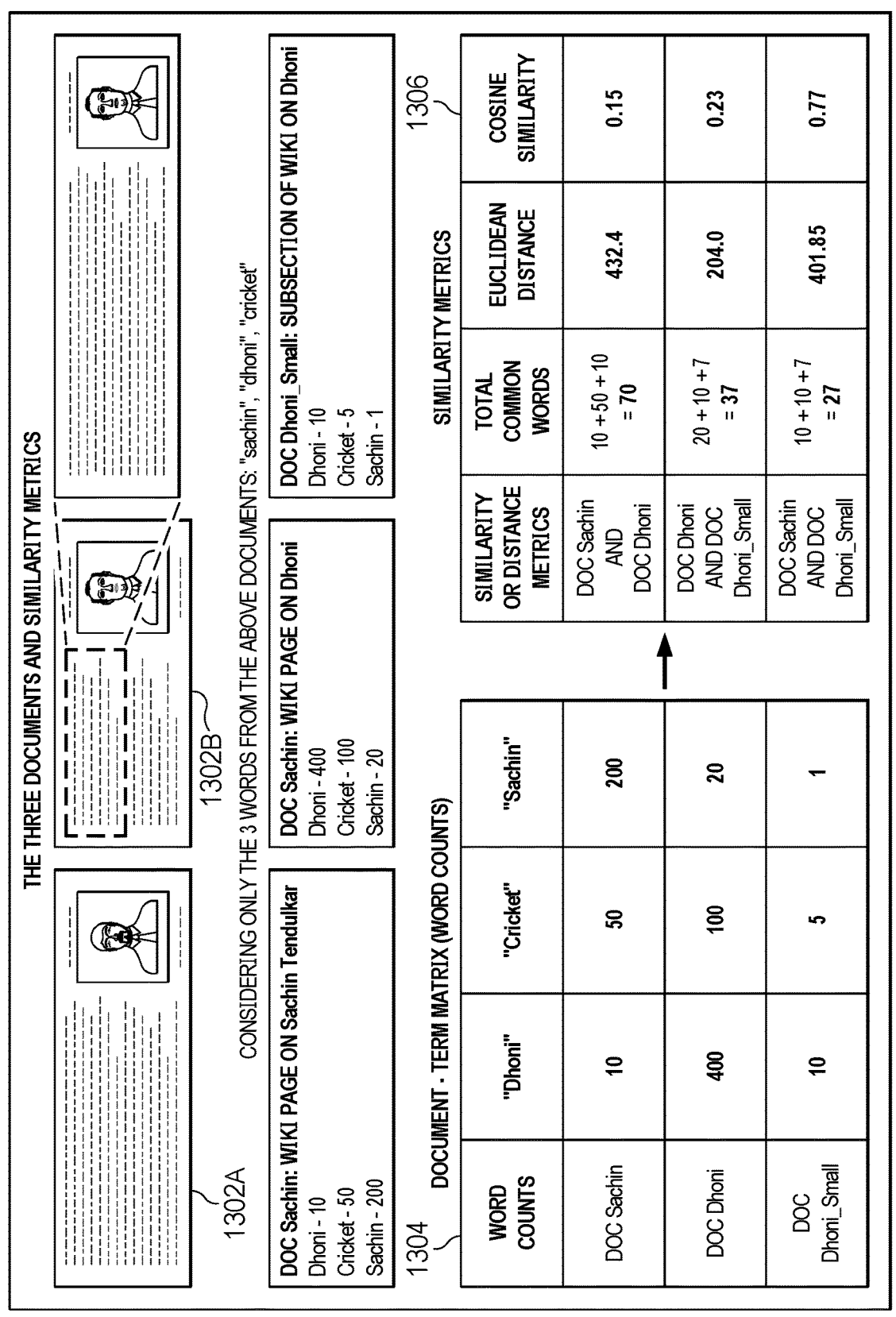

THE THREE DOCUMENTS AND SIMILARITY METRICS 1302A  1302B  1306

CONSIDERING ONLY THE 3 WORDS FROM THE ABOVE DOCUMENTS: "sachin", "dhoni", "cricket"

DOC Sachin: WIKI PAGE ON Sachin Tendulkar
Dhoni - 10
Cricket - 50
Sachin - 200

DOC Sachin: WIKI PAGE ON Dhoni
Dhoni - 400
Cricket - 100
Sachin - 20

DOC Dhoni_Small: SUBSECTION OF WIKI ON Dhoni
Dhoni - 10
Cricket - 5
Sachin - 1

1304  DOCUMENT - TERM MATRIX (WORD COUNTS)

| WORD COUNTS | "Dhoni" | "Cricket" | "Sachin" |
|---|---|---|---|
| DOC Sachin | 10 | 50 | 200 |
| DOC Dhoni | 400 | 100 | 20 |
| DOC Dhoni_Small | 10 | 5 | 1 |

SIMILARITY METRICS

| SIMILARITY OR DISTANCE METRICS | TOTAL COMMON WORDS | EUCLIDEAN DISTANCE | COSINE SIMILARITY |
|---|---|---|---|
| DOC Sachin AND DOC Dhoni | 10 + 50 + 10 = 70 | 432.4 | 0.15 |
| DOC Dhoni AND DOC Dhoni_Small | 20 + 10 + 7 = 37 | 204.0 | 0.23 |
| DOC Sachin AND DOC Dhoni_Small | 10 + 10 + 7 = 27 | 401.85 | 0.77 |

FIG. 13

SYSTEM AND METHOD OF OBJECTIVE-DRIVEN INTELLIGENT NAVIGATION

CROSS REFERENCE TO RELATED APPLICATIONS

The present disclosure is related to that disclosed in the U.S. Provisional Application No. 63/236,099, filed Aug. 23, 2021, entitled "System and Method of Action-Based Navigation Visualization for Supply Chain Planners and Specially-Abled Users," and U.S. Provisional Application No. 63/236,100, filed Aug. 23, 2021, entitled "System and Method of Objection-Driven Intelligent Navigation." U.S. Provisional Application Nos. 63/236,099 and 63/236,100 are assigned to the assignee of the present application. The present invention hereby claims priority under 35 U.S.C. § 119 (e) to U.S. Provisional Application Nos. 63/236,099 and 63/236,100.

TECHNICAL FIELD

The present disclosure relates generally to user interfaces and specifically to user interfaces with guided and predictive navigation.

BACKGROUND

Supply chain software is frequently a complex and intricate system, reflecting the complexity of supply chains themselves. As a result, existing supply chain software suffers from ease-of-use problems, such as users becoming distracted by the amount of information available on screen at any one time, which may result in users losing their place in software navigation, spending too much time performing tasks in the supply chain software, and being unable to determine how to progress to their goal in the supply chain software. Further, existing supply chain systems provide little or no guidance to users attempting to navigate supply chain software. Thus, the use of existing supply chain software results in user experiences which are time consuming, confusing, and error-prone, which is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 5 illustrates a block diagram representing the flow of data from a user input to a chat bot response, according to an embodiment;

FIG. 6 illustrates a simplified example of the user input and the bot response using the navigation system, disclosed above;

FIG. 13 illustrates a similarity metrics example, according to an embodiment;

DETAILED DESCRIPTION

Figure 1:
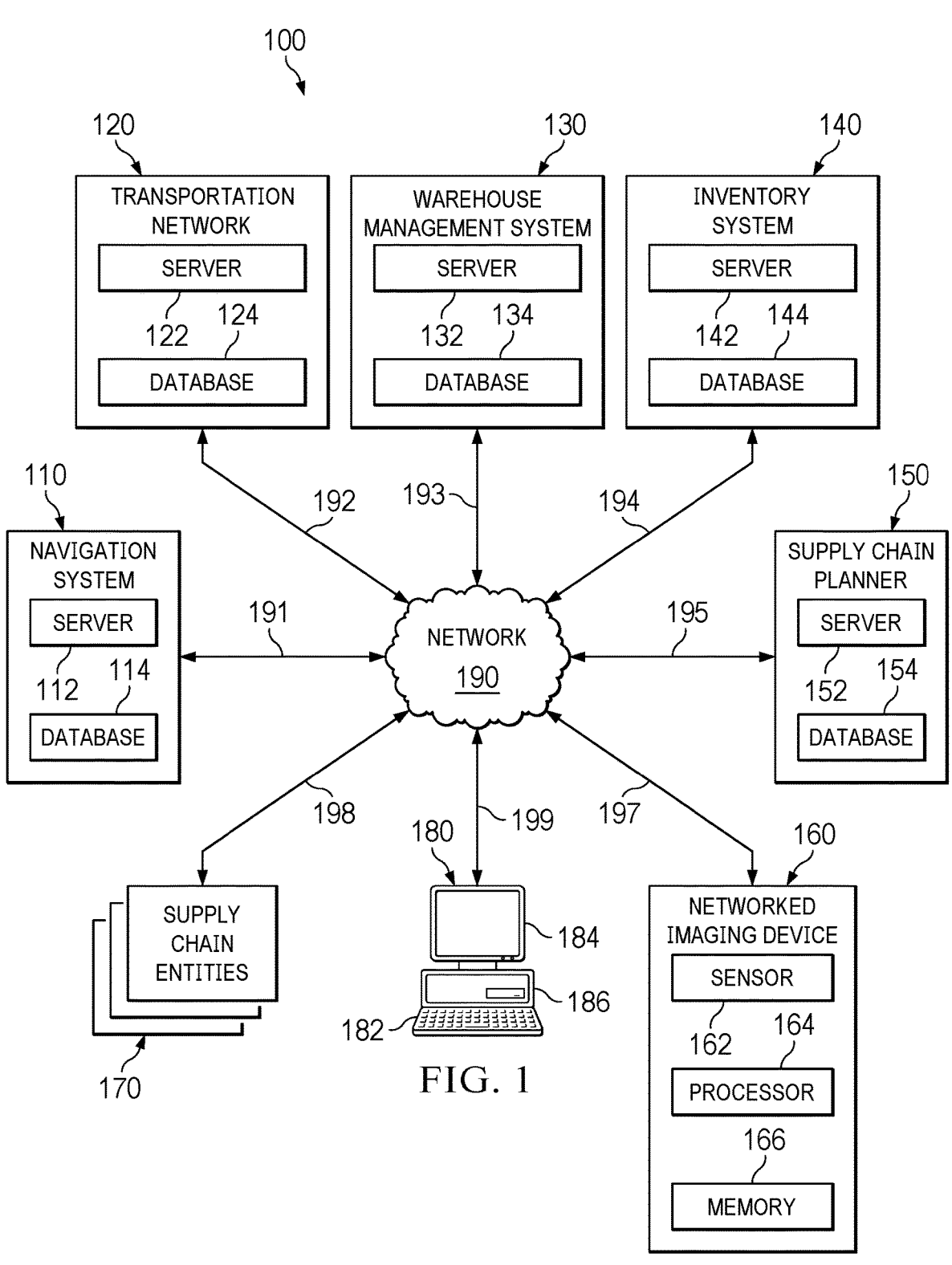
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Embodiments enable supply chain user interface systems which can use a machine learning based recommendation engine, which provides a user an actionable guide for navigation of supply chain software based on probabilities of supply chain decisions. Embodiments provide a framework for supply chain software which provides a goal-oriented end-to-end solution for recommending actions within a supply chain. Embodiments further provide an algorithm for supply chain navigation using probabilistic matrix factorization. This algorithm represents a robust formal mathematical framework to model assumptions in the supply chain network and study the effects of the assumptions in the recommendation process. Embodiments provide a guided workflow for all application scenarios backed by keyboard accessibility, allowing users to select a task from an available task list and display a formulated shortest path.

Embodiments provide supply chain software which helps users to increase their efficiency using the supply chain software, and improve the navigation speed through the software. Embodiments may allow for easier guiding and learning through complex software, such as supply chain software. Embodiments provide efficient, consistent inputs which may be used to navigate supply chain software and enable data entry without the use of a mouse. Use of embodiments allows for the creation of a knowledge base within the supply chain domain, which may be used with other intelligent services in a supply chain system.

FIG. 1 illustrates supply chain network 100, in accordance with a first embodiment. Supply chain network 100 comprises navigation system 110, transportation network 120, warehouse management system 130, inventory system 140, supply chain planner 150, networked imaging device 160, one or more supply chain entities 170, computer 180, network 190, and one or more communication links 191-199. Although a single navigation system 110, a single transportation network 120, a single warehouse management system 130, a single inventory system 140, a single supply chain planner 150, a single networked imaging device 160, one or more supply chain entities 170, a single computer 180, a single network 190, and one or more communication links 191-199 are shown and described, embodiments contemplate any number of navigation systems 110, transportation network 120, warehouse management system 130, inventory system 140, supply chain planner 150, networked imaging devices 160, supply chain entities 170, computers 180, networks 190, or communication links 191-199, according to particular needs.

In one embodiment, navigation system 110 comprises server 112 and database 114. Navigation system 110 generates a graphical user interface (GUI) with keyboard- and conversation-based interfaces supported by natural language processing (NLP) to provide voice- or text-based interactions. One or more modules of server 112 provide the GUI with predictive, intelligent, and context-dependent recommendations for actions and navigations to complete user-based tasks. In addition, navigation system 110 may include step-by-step intelligent task guidance and dynamically-updated task and action shortcuts and context-specific navigations using machine-learning based predictions and analytics. Database 114 may comprise one or more databases or other data storage arrangement at one or more locations, local to, or remote from, server 112.

Transportation network 120 of supply chain network 100 comprises server 122 and database 124. Although transportation network 120 is illustrated as comprising a single server 122 and a single database 124, embodiments contemplate any suitable number of servers 122 or databases 124 internal to or externally coupled with transportation network 120. According to embodiments, transportation network 120 directs one or more transportation vehicles to ship one or more items between one or more supply chain entities 170, based, at least in part, on a supply chain plan, including a supply chain master plan, the number of items currently in stock at one or more supply chain entities 170 or other stocking location, the number of items currently in transit in transportation network 120, a forecasted demand, a supply chain disruption, and/or one or more other factors described herein. One or more transportation vehicles comprise, for example, any number of trucks, cars, vans, boats, airplanes, unmanned aerial vehicles (UAVs), cranes, robotic machinery, or the like. The one or more transportation vehicles may comprise radio, satellite, or other communication that communicates location information (such as, for example, geographic coordinates, distance from a location, global positioning satellite (GPS) information, or the like) with navigation system 110, transportation network 120, warehouse management system 130, inventory system 140, supply chain planner 150, networked imaging device 160, and/or one or more supply chain entities 170 to identify the location of the one or more transportation vehicles and the location of any inventory or shipment located on the one or more transportation vehicles.

Warehouse management system 130 of supply chain network 100 comprises server 132 and database 134. Although warehouse management system 130 is illustrated as comprising a single server 132 and a single database 134, embodiments contemplate any suitable number of servers 132 or databases 134 internal to or externally coupled with warehouse management system 130. According to embodiments, server 132 comprises one or more modules that manage and operate warehouse operations, plan timing and identity of shipments, generate picklists, packing plans, and instructions. Warehouse management system 130 instructs users and/or automated machinery to obtain picked items and generates instructions to guide placement of items on a picklist in the configuration and layout determined by a packing plan. For example, the instructions may instruct a user and/or automated machinery to prepare items on a picklist for shipment by obtaining the items from inventory or a staging area and packing the items on a pallet in a proper configuration for shipment. Embodiments contemplate warehouse management system 130 determining routing, packing, or placement of any item, package, or container into any packing area, including, packing any item, package, or container in another item, package, or container. Warehouse management system 130 may generate instructions for packing products into boxes, packing boxes onto pallets, packing loaded pallets into trucks, or placing any item, container, or package in a packing area, such as, for example, a box, a pallet, a shipping container, a transportation vehicle, a shelf, a designated location in a warehouse (such as a staging area), and the like.

Inventory system 140 of supply chain network 100 comprises server 142 and database 144. Although inventory system 140 is illustrated as comprising a single server 142 and a single database 144, embodiments contemplate any suitable number of servers 142 or databases 144 internal to or externally coupled with inventory system 140. Server 142 of inventory system 140 is configured to receive and transmit item data, including item identifiers, pricing data, attribute data, inventory levels, and other like data about one or more items at one or more stocking locations in supply chain network 100. Server 142 stores and retrieves item data from database 144 or from one or more locations in supply chain network 100.

Supply chain planner 150 of supply chain network 100 comprises server 152 and database 154. Although supply chain planner 150 is illustrated as comprising a single server 152 and a single database 154, embodiments contemplate any suitable number of servers 152 or databases 154 internal to or externally coupled with supply chain planner 150. Supply chain planner 150 models and solves supply chain planning problems (such as, for example, operation planning problems). Supply chain planner 150 generates the supply chain planning problem solutions. Embodiments contemplate providing the supply chain planning data, models, problems, and solutions to knowledge base 216 of navigation system 110 to automatically fill entities or slots missing in tasks or when generated predictions of subsequent actions, navigations, or tasks.

One or more networked imaging devices 160 comprise one or more processors 164, memory 166, one or more sensors 162, and may include any suitable input device, output device, fixed or removable computer-readable storage media, or the like. According to embodiments, one or more networked imaging devices 160 comprise an electronic device that receives imaging data from one or more sensors 162 or from one or more databases in supply chain network 100. One or more sensors 162 of one or more networked imaging devices 160 may comprise an imaging sensor, such as, a camera, scanner, electronic eye, photodiode, charged coupled device (CCD), or any other electronic component that detects visual characteristics (such as color, shape, size, fill level, or the like) of objects. One or more networked imaging devices 160 may comprise, for example, a mobile handheld electronic device such as, for example, a smartphone, a tablet computer, a wireless communication device, and/or one or more networked electronic devices configured to image items using one or more sensors 162 and transmit product images to one or more databases. In addition, or as an alternative, one or more sensors 162 may comprise a radio receiver and/or transmitter configured to read an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or like objects that encode identifying information. One or more networked imaging devices 160 may generate a mapping of one or more items in supply chain network 100 by scanning an identifier or object associated with an item and identifying the item based, at least in part, on the scan. This may include, for example, a stationary scanner located at one or more supply chain entities 170 that scans items as the items pass near the scanner. As explained in more detail below, navigation system 110, transportation network 120, warehouse management system 130, inventory system 140, supply chain planner 150, networked imaging devices 160, and/or one or more supply chain entities 170 may use the mapping of an item to locate the item in supply chain network 100. The location of the item may be used to coordinate the storage and transportation of items in supply chain network 100 according to one or more actions, tasks, scenarios, plans and/or a reallocation of materials or capacity generated by transportation network 120, warehouse management system 130, inventory system 140, and supply chain planner 150. Plans may comprise one or more of a master supply chain plan, production plan, operations plan, distribution plan, and the like. The plans may be selected according to one or more scenarios and are generated and modified by one or more actions and tasks.

One or more supply chain entities 170 may include, for example, one or more retailers, distribution centers, manufacturers, suppliers, customers, and/or similar business entities configured to manufacture, order, transport, or sell one or more products. Retailers may comprise any online or brick-and-mortar store that sells one or more products to one or more customers. Manufacturers may be any suitable entity that manufactures at least one product, which may be sold by one or more retailers. Suppliers may be any suitable entity that offers to sell or otherwise provides one or more items (i.e., materials, components, or products) to one or more manufacturers.

As shown in FIG. 1, supply chain network 100 comprising navigation system 110, transportation network 120, warehouse management system 130, inventory system 140, supply chain planner 150, one or more networked imaging devices 160, and one or more supply chain entities 170 may operate on one or more computers 180 that are integral to or separate from the hardware and/or software that support navigation system 110, transportation network 120, warehouse management system 130, inventory system 140, supply chain planner 150, one or more networked imaging devices 160, and one or more supply chain entities 170. One or more computers 180 may include any suitable input device 182, such as a keypad, mouse, touch screen, microphone, or other device to input information. Output device 184 may convey information associated with the operation of supply chain network 100, including digital or analog data, visual information, or audio information.

One or more computers 180 may include fixed or removable computer-readable storage media 186, including a non-transitory computer readable medium, magnetic computer disks, flash drives, CD-ROM, in-memory device or other suitable media to receive output from and provide input to supply chain network 100. One or more computers 180 may include one or more processors and associated memory to execute instructions and manipulate information according to the operation of supply chain network 100 and any of the methods described herein. In addition, or as an alternative, embodiments contemplate executing the instructions on one or more computers 180 that cause one or more computers 180 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible computer-readable media that have computer-readable instructions encoded thereon, and the instructions may comprise instructions to perform functions of the methods described herein.

Navigation system 110, transportation network 120, warehouse management system 130, inventory system 140, supply chain planner 150, one or more networked imaging devices 160, and one or more supply chain entities 170 may each operate on one or more separate computers, a network of one or more separate or collective computers, or may operate on one or more shared computers. In addition, supply chain network 100 may comprise a cloud-based computing system having processing and storage devices at one or more locations, local to, or remote from navigation system 110, transportation network 120, warehouse management system 130, inventory system 140, supply chain planner 150, one or more networked imaging devices 160, and one or more supply chain entities 170. In addition, each of one or more computers 180 may be a workstation, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with navigation system 110, transportation network 120, warehouse management system 130, inventory system 140, supply chain planner 150, one or more networked imaging devices 160, and one or more supply chain entities 170.

These one or more users may include, for example, a "manager" or a "planner" handling supply chain planning, configuring navigation system 110, and/or one or more related tasks within supply chain network 100. In addition, or as an alternative, these one or more users within supply chain network 100 may include, for example, one or more computers 180 programmed to autonomously handle, among other things, production planning, demand planning, option planning, sales and operations planning, operation planning, supply chain master planning, plan adjustment after supply chain disruptions, order placement, automated warehouse operations (including removing items from and placing items in inventory), robotic production machinery (including producing items), and/or one or more related tasks within supply chain network 100.

Although communication links 191-199 are shown as generally coupling navigation system 110, transportation network 120, warehouse management system 130, inventory system 140, supply chain planner 150, networked imaging device 160, one or more supply chain entities 170, and computer 180 to network 190, each of navigation system 110, transportation network 120, warehouse management system 130, inventory system 140, supply chain planner 150, networked imaging device 160, one or more supply chain entities 170, and computer 180 may communicate directly with each other, according to particular needs. In another embodiment, network 190 includes the Internet and any appropriate local area networks (LANs), metropolitan area networks (MANs), or wide area networks (WANs) coupling navigation system 110, transportation network 120, warehouse management system 130, inventory system 140, supply chain planner 150, networked imaging device 160, one or more supply chain entities 170, and computer 180. For example, data may be maintained locally or externally of navigation system 110, transportation network 120, warehouse management system 130, inventory system 140, supply chain planner 150, networked imaging device 160, one or more supply chain entities 170, and computer 180 and made available to one or more associated users of navigation system 110, transportation network 120, warehouse management system 130, inventory system 140, supply chain planner 150, networked imaging device 160, one or more supply chain entities 170, and computer 180 using network 190 or in any other appropriate manner. Those skilled in the art will recognize that the complete structure and operation of network 190 and other components within supply chain network 100 are not depicted or described. Embodiments may be employed in conjunction with known communications networks and other components.

In accordance with the principles of embodiments described herein, supply chain planner 150 may generate a supply chain plan. Furthermore, one or more computers 180 associated with transportation network 120, warehouse management system 130, and inventory system 140 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 170, and the configuration and quantity of packaging and shipping of items based on a supply chain plan, one or more tasks, actions, and scenarios generated by one or more users and which may be used to generate or modify the supply chain plan, the number of items currently in stock at one or more supply chain entities 170, the number of items currently in transit in transportation network 120, a forecasted demand, a supply chain disruption, a material or capacity reallocation, current and projected inventory levels at one or more stocking locations, and/or one or more additional factors described herein. For example, the methods described herein may include computers 180 receiving product data 264 from automated machinery having at least one sensor and product data 264 corresponding to an item detected by the automated machinery. The received product data 264 may include an image of the item, an identifier, as described above, and/or product information associated with the item, including, for example, dimensions, texture, estimated weight, and the like. Computers 180 may also receive, from the one or more sensors of one or more networked imaging devices 160, a current location of the identified item.

Figure 2:
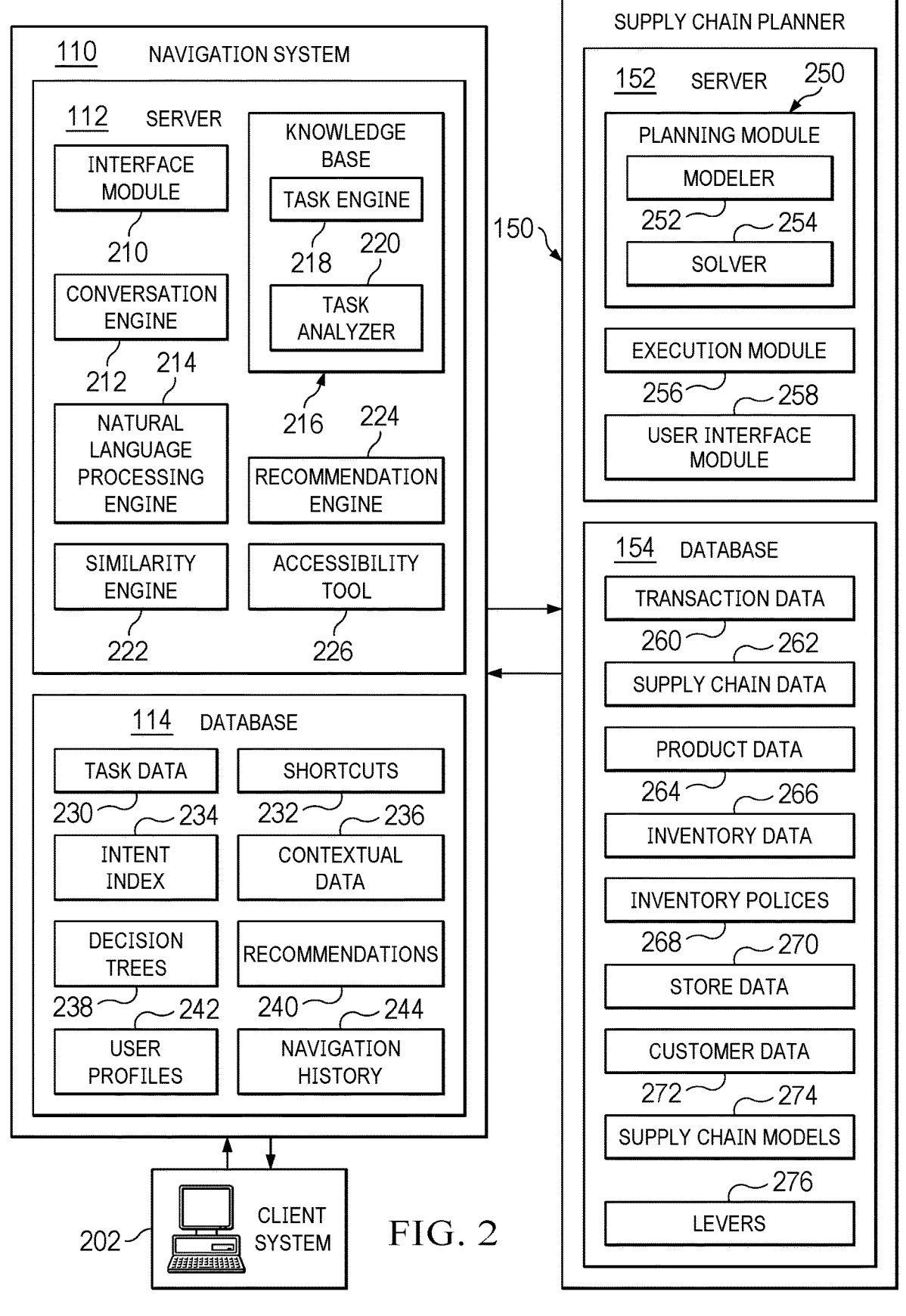
FIG. 2 illustrates the client system and the navigation system and the supply chain planner of FIG. 1 in greater detail, in accordance with an embodiment.

FIG. 2 illustrates client system 202 and navigation system 110 and supply chain planner 150 of FIG. 1 in greater detail, in accordance with an embodiment. Client system 202 comprises one or more computers 180, as disclosed above. According to some embodiments, the client comprises a thick client, such as, for example, a software application, compiled and running on a computer or server. According to other embodiments, the client comprises a thin client, such as, for example, code executed by a webpage within a web browser. According to some embodiments, the client comprises a hybrid client comprising features of both thick and thin clients. Client system 202 is configured to display the GUI of navigation system 110, receive user inputs 502, transmit user inputs 502 to navigation system 110 or supply chain planner 150, and request and receive information from navigation system 110 and the one or more supply chain planners and execution systems, as described in further detail below.

Navigation system 110 comprises server 112 and database 114, as disclosed above. Although navigation system 110 is shown as comprising a single server 112 and a single database 114, embodiments contemplate any suitable number of servers 112 or databases 114 internal to or externally coupled with navigation system 110.

Server 112 comprises interface module 210, conversation engine 212, NLP engine 214, knowledge base 216, similarity engine 222, recommendation engine 224, and accessibility tool 226. Although server 112 is shown and described as comprising a single interface module 210, a single conversation engine 212, a single NLP engine 214, a single knowledge base 216, a single similarity engine 222, a single recommendation engine 224, and a single accessibility tool 226, embodiments contemplate any suitable number or combination of these located at one or more locations, local to, or remote from navigation system 110, such as on multiple servers or computers at one or more locations in supply chain network 100.

Interface module 210 generates a multi-level navigable interactive GUI. According to one embodiment, interface module 210 displays text and graphical elements to navigate the actions needed to perform tasks associated with roles of one or more workers. In addition, interface module 210 may further cause the GUI to display text or graphics that respond or answer a question, display an analytic that explains choices between answers to a question, a graphical element comprising a single object, a graphical element comprising an object list, a list with choices, or a guided procedure comprising any number of one or more actions, which may comprise one or steps of one or more tasks, according to particular needs. Interface module 210 provides for initiating actions based on the messages processed by conversation interface 304.

Conversation engine 212 provides conversation interface 304 (such as, for example, a chatbot interface) for sending and receiving messages and displaying the incoming and outgoing messages, as described in further detail below.

NLP engine 214 implements natural language phrases related to information needs, user input 502, initiating tasks and actions, and the like. In one embodiment, conversation engine 212 transmits voice- and text-based user inputs 502 to NLP engine 214, such as, for example, a third-party natural language processing system (such as, for example, GOOGLE Dialogue Flow or MICROSOFT Bot Framework) and receives the intent mapped to the natural language input. According to embodiments, natural language processing system interprets user input 502 according to one or more meta-classes such as, for example, RECOGNIZE <specific information>, OVERVIEW <data set>, SELECT <option>, ENTER <content>, INITIATE <execution of service>, and/ or the like. By way of example only and not by way of limitation, identifying a user intent according to the REC-OGNIZE meta-class comprises identifying a single value, face or item and providing by an output device, a name, value, fact, or the like. In addition, or as an alternative, an OVERVIEW meta-class comprises identifying a dataset or collection of items and providing by an output device, a list of items or datasets, a summary statement of the items or data sets, a first item or a predetermined number of items or datasets, a list of tasks, actions, navigations, and the like. According to embodiments, a SELECT meta-class comprises selecting an existing item or value and providing for an input to displayed or predetermined list or dataset, a selection from a list of options (including a dynamic list of options), and the like. Embodiments contemplate an ENTER meta-class that identifies user-defined content within the natural language input and provides for entry of user-input according to the interpretation by the natural language system. Embodiments of the INITIATE meta-class comprises executing a service, which may include executing a service according to one or more parameters identified in the natural language input. As described in further detail below, the intent of the natural language input may be interpreted according to the complexity of the response, wherein the complexity of the response may be based on the quantity, richness, or other quality of the data. According to an embodiment, intents determined according to the RECOG-NIZE, ENTER, and INITIATE meta-classes may comprise a low-complexity. In addition, or as an alternative, intents determined according to the OVERVIEW and SELECT meta-classes comprise difficult or high-complexity. As described in further detail below, conversation interface 304 of the GUI displays based, at least in part, on the intent and a complexity of the natural language input.

According to embodiments, knowledge base 216 stores a searchable index of definitions which define the task associated with each intent. In addition or as an alternative, knowledge base 216 may comprise the entities and slots that define parameters of the task, and the number of activities (or steps) to complete the task. According to some embodiments, knowledge base 216 comprises task engine 218 and task analyzer 220. Task engine 218 identifies tasks in access portal 302, GUI, or other application, indexes the tasks, and ranks tasks based, at least in part, on their similarity to a user intent. Task analyzer 220 fetches the task most relevant to the user intent and determines number of steps 604 to complete the task and the slots or entities used by the task at each step.

Similarity engine 222 measures the similarities of actions and navigation between different users, between the same user at different times or for different tasks, and the like by calculating one or more similarity scores. Embodiments contemplate any suitable method to calculate similarity scores, such as, for example cosine, Jaccard, mathematical formulas, and the like, as described in further detail below.

Recommendation engine 224 uses similarity scores, knowledge base 216, and probabilistic matrix factorization, to generate recommendations that predict a subsequent action, task, or navigation for a user to complete a role- or user-based task. In some embodiments, the generated recommendations identify the predicted task, the number of remaining steps to complete the task, and the slots and entities needed to complete the steps.

Accessibility tools 226 provide screen reading, key tap, talk back, or other accessibility options for specially-abled users. In addition, power users may also rely on similar Accessibility tools 226 that address the problem of information overload and accessibility.

Database 114 of navigation system 110 may comprise one or more databases or other data storage arrangement at one or more locations, local to, or remote from, server 112. Database 114 of navigation system 110 comprises, for example, task data 230, shortcuts 232, intent index 234, contextual data 236, decision trees 238, recommendations 240, user profiles 242, and navigation history 244. Although database 114 of navigation system 110 is shown and described as comprising task data 230, shortcuts 232, intent index 234, contextual data 236, decision trees 238, recommendations 240, user profiles 242, and navigation history 244, embodiments contemplate any suitable number or combination of these, located at one or more locations, local to, or remote from, navigation system 110 according to particular needs.

In one embodiment, task data 230 comprises an index of the actions and roles associated with each task. In addition, the tasks are associated with intents which are used by NLP engine 214 to identify tasks from a natural language input and to provide responsive language displayed by conversation interface 304. Tasks may be assigned to one or more roles, wherein the tasks that need to be performed by a worker, assigned the particular role, to meet the needs of the business.

Shortcuts 232 comprise hotkey or keyboard shortcuts for initiating an action or navigation. As described in further detail below, the user interface displays shortcuts 232 based on the context associated with the current and previous states of user, the interface, and navigation history 244. The navigation shortcuts provide, for example, navigating from a current zone or location of the user interface to the location or zone associated with the executed shortcut.

According to embodiments, intent index 234 is used by the natural language processing engine to assign the closest-matching intents to speech or text inputs received from one or more users. The intents are categorical assignments that describe the purpose or goal of the natural language input. One or more alternative phrases may be mapped to the same intent.

In some embodiments, recommendation engine 224 utilizes contextual data 236 to override an action or task identified by the intent of the natural language input, by relying on additional contextual data 236, which may include, but is not limited to, previously-decoded speech, the text or graphics currently displayed on conversation interface 304, the GUI interface, the relationships between different roles in the worker hierarchy, navigation history 244, and other like data. Conversation engine 212 may send an event to a service of navigation system 110, client system 202, or the like, and which is mapped to the corresponding GUI interface.

Decision trees 238 represent decision and decision making of supply chain planning and execution processes. Decision trees 238 may be used by recommendation engine 224 in order to generate one or more recommendations 240.

Recommendations 240 comprise one or more recommendations made by recommendation engine 224 concerning a next step or action to be taken. Recommendations 240 may be based on the conditional probabilities between various nodes of decision tree 238. Recommendations 240 predict a subsequent action, task, or navigation for a user to complete a role- or user-based task. In some embodiments, the generated recommendations identify the predicted task, the number of remaining steps to complete the task, and the slots and entities needed to complete the steps. In addition, or as an alternative, recommendations 240 may be based, at least in part, on the confidence score calculated according to the cosine similarity.

As described in further detail below, user profiles 242 and navigation history 244 comprise historical data, which will be collected from any supply chain planning and execution module 256, business process, or other data source internal to, or external of, supply chain network 100.

As disclosed above, supply chain planner 150 may comprise server 152 and database 154. Although supply chain planner 150 is shown as comprising a single server 152 and a single database 154, embodiments contemplate any suitable number of servers 152 or databases 154 internal to or externally coupled with supply chain planner 150.

Server 152 of supply chain planner 150 comprises planning module 250, execution module 256, and user interface module 258. Although server 152 is shown and described as comprising a single planning module 250, a single execution module 256, and a single user interface module 258, embodiments contemplate any suitable number or combination of planning modules 250, execution modules 256, and user interface modules 258, located at one or more locations, local to, or remote from supply chain planner 150, such as on multiple servers or computers at one or more locations in supply chain network 100.

Database 154 of supply chain planner 150 may comprise one or more databases or other data storage arrangement at one or more locations, local to, or remote from, server 152. Database 154 of supply chain planner 150 comprises, for example, transaction data 260, supply chain data 262, product data 264, inventory data 266, inventory policies 268, store data 270, customer data 272, supply chain models 274, and levers 276. Although database 154 of supply chain planner 150 is shown and described as comprising transaction data 260, supply chain data 262, product data 264, inventory data 266, inventory policies 268, store data 270, customer data 272, supply chain models 274, and levers 276, embodiments contemplate any suitable number or combination of data, located at one or more locations, local to, or remote from, supply chain supply chain planner 150, according to particular needs.

Planning module 250 comprises modeler 252 and solver 254. Although planning module 250 is shown and described as comprising a single modeler 252 and a single solver 254, embodiments contemplate any suitable number or combination of these located at one or more locations, local to, or remote from planning module 250, such as on multiple servers or computers at any location in supply chain network 100.

Modeler 252 may model one or more supply chain planning problems of supply chain network 100. According to one embodiment, modeler 252 identifies resources, operations, buffers, and pathways, and maps supply chain network 100 using supply chain network 100 models, as disclosed above. For example, modeler 252 models a supply chain planning problem that represents supply chain network 100 as supply chain network 100 model, an LP optimization problem, or other type of input to solver 254. As disclosed above, embodiments contemplate modeler 252 providing supply chain network 100 model to navigation system 110.

According to embodiments, solver 254 of planning module 250 generates a solution to a supply chain planning problem. Solver 254 may comprise an LP optimization solver, a heuristic solver, a mixed-integer problem solver, a MAP solver, an LP solver, a Deep Tree solver, and the like. According to some embodiments, solver 254 solves a supply chain planning problem.

Execution module 256 executes one or more supply chain processes such as, for example, instructing automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 170, and the configuration and quantity of packaging and shipping of items based on a supply chain plan, the number of items currently in stock at one or more supply chain entities 170, the number of items currently in transit in transportation network 120, a forecasted demand, a supply chain disruption, a material or capacity reallocation, current and projected inventory levels at one or more stocking locations, a selected lever, and/or one or more additional factors described herein. For example, execution module 256 may send instructions to the automated machinery to locate items to add to or remove from an inventory of or shipment for one or more supply chain entities 170.

User interface module 258 of supply chain planner 150 generates and displays a UI, such as, for example, a GUI, that displays one or more interactive visualizations of transaction data 260, supply chain data 262, product data 264, inventory data 266, inventory policies 268, store data 270, customer data 272, supply chain models 274, and levers 276. According to embodiments, user interface module 258 displays a GUI comprising interactive graphical elements for selecting one or more supply chain network 100 components, modeling supply chain network 100 as an object model, formulating supply chain network 100 as a supply chain planning problem, solving the supply chain planning problem, displaying and providing for selection of one or more levers 276, and displaying one or more solutions or supply chain plans.

Transaction data 260 may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 260 is represented by any suitable combination of values and dimensions, aggregated or un-aggregated, such as, for example, sales per week, sales per week per location, sales per day, sales per day per season, or the like.

Supply chain data 262 may comprise any data of one or more supply chain entities 170 including, for example, item data, identifiers, metadata (comprising dimensions, hierarchies, levels, members, attributes, cluster information, and member attribute values), fact data (comprising measure values for combinations of members) of one or more supply chain entities 170. Supply chain data 262 may also comprise for example, various decision variables, business constraints, goals, and objectives of one or more supply chain entities 170. According to some embodiments, supply chain data 262 may comprise hierarchical objectives specified by, for example, business rules, master planning requirements, scheduling constraints, and discrete constraints, including, for example, sequence dependent setup times, lot-sizing, storage, shelf life, and the like.

Product data 264 may comprise products identified by, for example, a product identifier (such as a Stock Keeping Unit (SKU), Universal Product Code (UPC) or the like), and one or more attributes and attribute types associated with the product ID. Product data 264 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 266 may comprise any data relating to current or projected inventory quantities or states, order rules, or the like. For example, inventory data 266 may comprise the current level of inventory for each item at one or more stocking points across supply chain network 100. In addition, inventory data 266 may comprise order rules that describe one or more rules or limits on setting an inventory policy, including, but not limited to, a minimum order volume, a maximum order volume, a discount, and a step-size order volume, and batch quantity rules. According to some embodiments, supply chain planner 150 accesses and stores inventory data 266 in database 154, which may be used by the planning and execution system to place orders, set inventory levels at one or more stocking points, initiate manufacturing of one or more components, or the like in response to, and based at least in part on, a supply chain plan or other output of supply chain planner 150. In addition, or as an alternative, inventory data 266 may be updated by receiving current item quantities, mappings, or locations from transportation network 120, warehouse management system 130, inventory system 140, supply chain planner 150, and/or one or more networked imaging devices 160.

Inventory policies 268 may comprise any suitable inventory policy describing the reorder point and target quantity, or other inventory policy parameters that set rules for supply chain planner 150 to manage and reorder inventory. Inventory policies 268 may be based on target service level, demand, cost, fill rate, or the like. According to embodiment, inventory policies 268 comprise target service levels that ensure that a service level of one or more supply chain entities 170 is met with a certain probability. For example, one or more supply chain entities 170 may set a service level at 95%, meaning one or more supply chain entities 170 will set the desired inventory stock level at a level that meets demand 95% of the time. Although, a particular service level target and percentage is described; embodiments contemplate any service target or level, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, navigation system 110 and/or supply chain planner 150 may determine a replenishment order according to one or more replenishment rules, which, among other things, indicates to one or more supply chain entities 170 to determine or receive inventory to replace the depleted inventory. By way of example and not of limitation, an inventory policy for non-perishable goods with linear holding and shorting costs comprises a min./max. (s,S) inventory policy. Other inventory policies 268 may be used for perishable goods, such as fruit, vegetables, dairy, fresh meat, as well as electronics, fashion, and similar items for which demand drops significantly after a next generation of electronic devices or a new season of fashion is released.

Store data 270 may comprise data describing the stores of one or more retailers and related store information. Store data 270 may comprise, for example, a store ID, store description, store location details, store location climate, store type, store opening date, lifestyle, store area (expressed in, for example, square feet, square meters, or other suitable measurement), latitude, longitude, and other similar data. Store data 270 may include demand forecasts for each store indicating future expected demand based on, for example, any data relating to past sales, past demand, purchase data, promotions, events, or the like of one or more supply chain entities 170. The demand forecasts may cover a time interval such as, for example, by the minute, hour, daily, weekly, monthly, quarterly, yearly, or any suitable time interval, including substantially in real time. Although demand forecasts are described as comprising a particular store, supply chain planner 150 may calculate a demand forecast at any granularity of time, customer, item, region, or the like.

Customer data 272 may comprise customer identity information, including, for example, customer relationship management data, loyalty programs, and mappings between one or more customers and transactions associated with those one or more customers such as, for example, product purchases, product returns, customer shopping behavior, and the like. Customer data 272 may comprise data relating customer purchases to one or more products, geographical regions, store locations, time period, or other types of dimensions.

Supply chain models 274 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 274 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model. Levers 276 comprise user-selectable interventions that may adjust cost, timing, quantity, speed, percentage, KPIs, or other measured value that reflects a performance or quality of a supply chain process. For example, a lever for a demand planner may comprise changing the delivery method to air from ground, when a percentage-on-time is lower than a threshold value in order to avoid late shipments.

Figure 3:
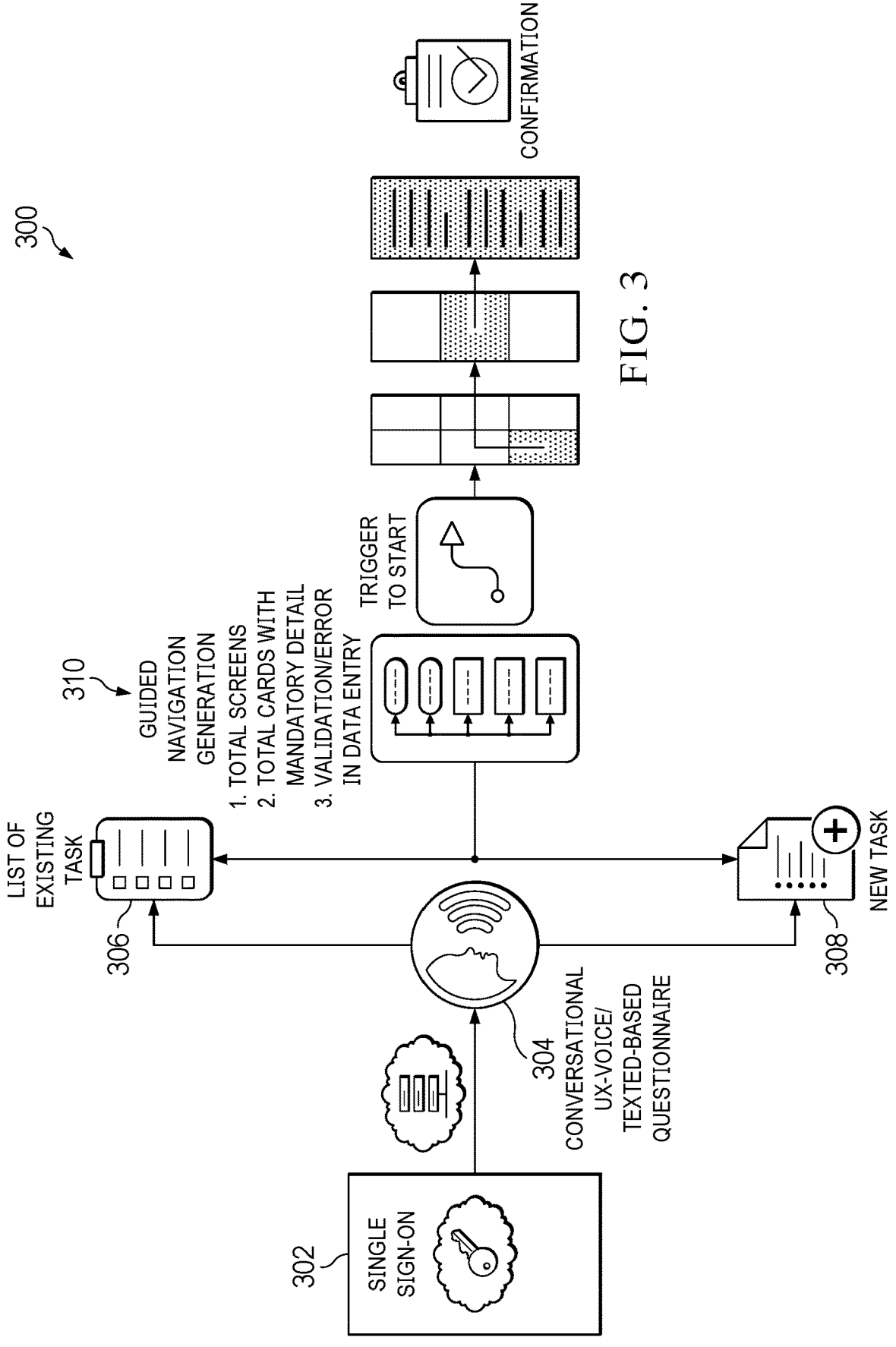
FIG. 3 illustrates the navigation system of FIG. 1, according to a further embodiment.

FIG. 3 illustrates navigation system 110 of FIG. 1, according to a further embodiment. Access portal 302 provides a user access to the GUI of navigation system 110. In one embodiment, access portal 302 is a single sign-on portal that provides access to conversation interface 304 of the GUI which allows performing role-related work tasks for transportation network 120, warehouse management system 130, inventory system 140, and supply chain planner 150. Access portal 302 and the user interface may be coupled with network 190 using one or more communications links 191-199, which may be any wireline, wireless, or other link suitable to support data communications between access portal 302, conversation interface 304, and network 190 during operation of supply chain network 100. According to embodiments, conversation interface 304 uses voice or text-based interaction to select one or more displayed elements (e.g., selecting a task from task list 306), initiate an action or new task 308, and/or provide guided navigation 310 to task completion.

Figure 4:
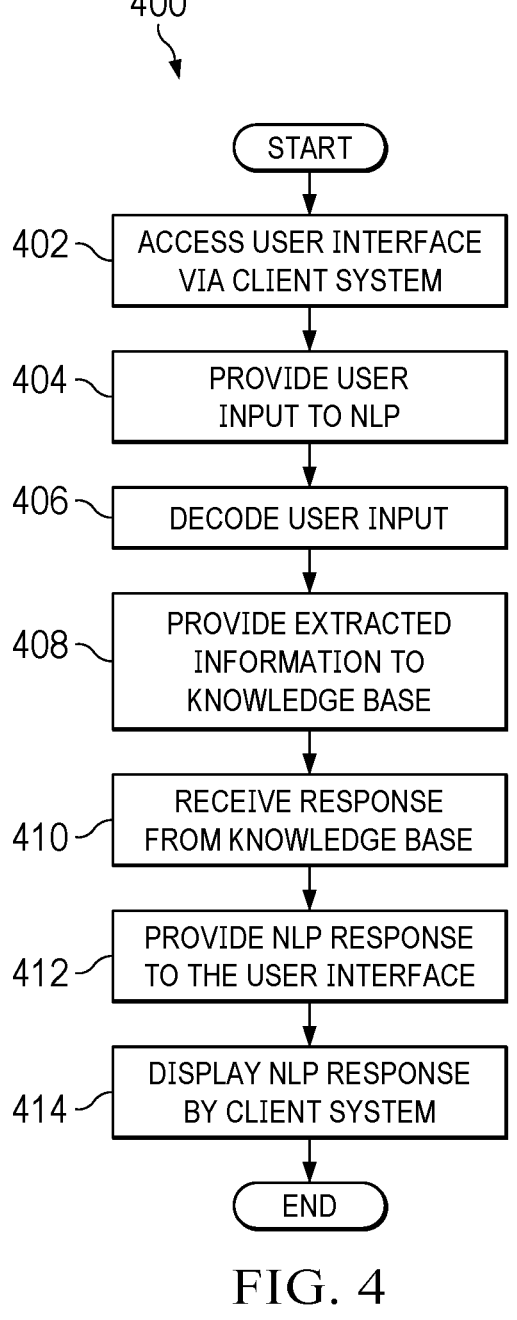
FIG. 4 illustrates the method of responding to requests using the conversation interface, according to an embodiment.

FIG. 4 illustrates method 400 of responding to requests using conversation interface 304, according to an embodiment. Method 400 comprises one or more activities, which although described in a particular order may be implemented in one or more combinations, according to particular needs.

Method 400 may begin at activity 402 by accessing the GUI via access portal 302 of client system 202. In one embodiment, access portal 302 comprises software, hardware, or both located local to, or remote from, client system 202 and which provides user access to the GUI.

At activity 404, conversation interface 304 provides user input 502 to a natural language processing (NLP) engine 214. Conversation interface 304 may display a task-list, available services (such as, for example a chatbot), tools, utilities, and the like. In one embodiment, a user may provide a natural language user input 502 comprising voice or text to conversation interface 304. By way of example only and not by way of limitation, a user may generate a query to conversation interface 304 related to defined events of a fulfilment manager and comprising, "What are the exceptions with my committed orders for a Medicine market in the northeast region?"

At activity 406, NLP engine 214 decodes user input 502. According to embodiments, decoding the natural language user input 502 comprises determining the intent of the input and any additional information relevant to the intent. Embodiments contemplate NLP engine 214 being context aware such that the intent is determined further according to a context associated with the natural language input, such as, for example, a list of recent tasks associated with the user providing the input, the role of the user, the time when the input was received, the current data displayed on the GUI, a previous user input 502, a goal or result of a task, a list of currently assigned or open tasks, and the like. Continuing with the previous example of the query related to the healthcare market in the northeast region for the fulfillment manager, NLP engine 214 decodes the intent as "view order's exceptions" and the following entities/slots:

Order type: Committed
    Market segment: Medicine, healthcare
    Location: Northeast region
    Owner: Pankaj R At activity 408, NLP engine 214 provides the extracted information to knowledge base 216 and, at activity 410, receives the response. In one embodiment, navigation system 110 searches knowledge base 216 for the definition of the intent extracted from the natural language input NLP engine 214. As disclosed above, knowledge base 216 may store a searchable index of definitions associated with intents that the system is able to decode from the natural language input. The definitions for the intents may be associated with any task, action, service, navigation, or function that is initiated by the user interface. The definitions may provide available or required parameters, syntax, available or required slots or entities, a number of steps or activities, modifications, or the like that may be decoded from the natural language input with the intent. By way of example only and not by way of limitation, knowledge base 216 may store definitions which define the task associated with each intent, the entities and slots that are needed or available to provide inputs during the task, modifications or parameters for the task, and the number of activities (or steps) to complete the task.

At activity 412, NLP engine 214 provides the natural language response to conversation interface 304 for display by the GUI to the user, at activity 414. According to some embodiments, the response generated by NLP engine 214 comprises number of steps and missing slots or entities needed to complete the task, as described in further detail below in the description of FIG. 6. In addition, or in the alternative, NLP engine 214 may generate response comprising a confirmation that a task associated with the intent is already completed, an action associated with the intent is being executed or cannot be executed, or any other suitable response to the identified user intent, according to particular needs.

FIG. 5 illustrates block diagram 500 representing the flow of data from user input 502 to chat bot response 504, according to an embodiment. Block diagram 500 comprises service interface 506 (such as, for example, conversation interface 304 of interface module 210), NLP layer 508 (such as, for example, NLP engine 214), knowledge base 216, and data storage location 510 (such as, for example, database 114 of navigation system 110) comprising interaction history and analytics. In one embodiment, service interface 506 generated by user interface module 258 interacts with the user using text or voice-based natural language interactions that comprise receiving natural language user input 502 and generating natural language responses. As disclosed above, conversation interface 304 comprises a chatbot that receives natural language from user input 502 and generates bot response 504 comprising a natural language reply to user input 502.

NLP layer 508 performs natural language processing using NLP engine 214 to decode user input 502 by extracting utterances, intents, entities, slots, selections, or other indication or meaning from the natural language input and providing the extracted data to knowledge base 216, data storage location 510, navigation system 110, transportation network 120, warehouse management system 130, inventory system 140, supply chain planner 150, client system 202, or other locations local to, or remote from, supply chain network 100. NLP engine 214 receives responses from the one or more locations and transforms the responses into natural language bot responses 504 displayed by conversation interface 304.

Data storage location 510 stores the interaction history and analytics, which are used by the intelligent navigation method to apply learning and statistics when selecting navigations and actions, as described in further detail below. In one embodiment, for example, navigation system 110 recommends navigations and actions based, at least in part, a learning model that incorporates historical intent and tasks for particular users or roles.

As described above, knowledge base 216 comprises intent-driven marker 512 on layouts which comprises actions and operations (tasks) that are possible on layouts and logical operations in each sequential step. For the client portal comprising a card-based design, navigation system 110 comprises defined page patterns with dedicated zones to utilities or services as scope, filters, collaboration, and the like. Intent-driven markers 512 comprise graphical elements (such as underlined initials) on cards based on the intent of a user to easily see and use a keyboard shortcut to jump and/or focus on the identified card. These markers may comprise accelerators for keyboard accessibility of layouts.

In addition, or as an alternative, knowledge base 216 comprises functional workflows 514 for an application or service that are defined by the application and may comprise a logical sequence of actions (activities or steps) of information and layouts, as disclosed in further detail below. For example, functional workflow 514 may comprise, in any service (such as, for example, assortment planning), the operations and tasks that are coupled with a business objective and functions of one or more features. By way of example only and not by way of limitation, the functional workflow 514 for assortment planning may comprise creating a first assortment activity by a user, reviewing and approving the first assortment by a second user (such as, for example, a manager), adding a store, products, and detail to the assortment by the first user or a third user, and performing other tasks and activities by other one or more users related to this or other functional workflows 514.

FIG. 6 illustrates simplified example 600 of user input 502 and the bot response 504 using navigation system 110, disclosed above. In this example, at activity 610, user input 502 received by conversation interface 304 comprises a natural language input comprising "create activity for sweets and beverages in the current season."

At activity 620, NLP layer 508 extracts the intent (initiate a create activity task) and entities/slots associated with intent, such as, for example, category type (sweets and beverages), timeline type (current season), and owner (current user, Pankaj R).

At activity 630, knowledge base 216 then performs task analysis to determine that the create activity task requires two steps, and three slots are missing from the natural language input. NLP engine 214 receives task identity 632, number of steps 634 needed, and missing slots 636 from knowledge base 216.

At activity 640, NLP engine 214 determines that two steps are needed to cover the task and that the steps details require defining key information and the stakeholder. The, at activity 650, conversation interface 304 receives the steps to cover quantity and the steps details from NLP engine 214 and generates a response (bot response 504) in a natural language format that explains that the create activity task requires two steps and provides a prompt for the user to execute guided navigation 310 from the GUI to complete the remaining steps and input any missing slots 606.

Figure 7:
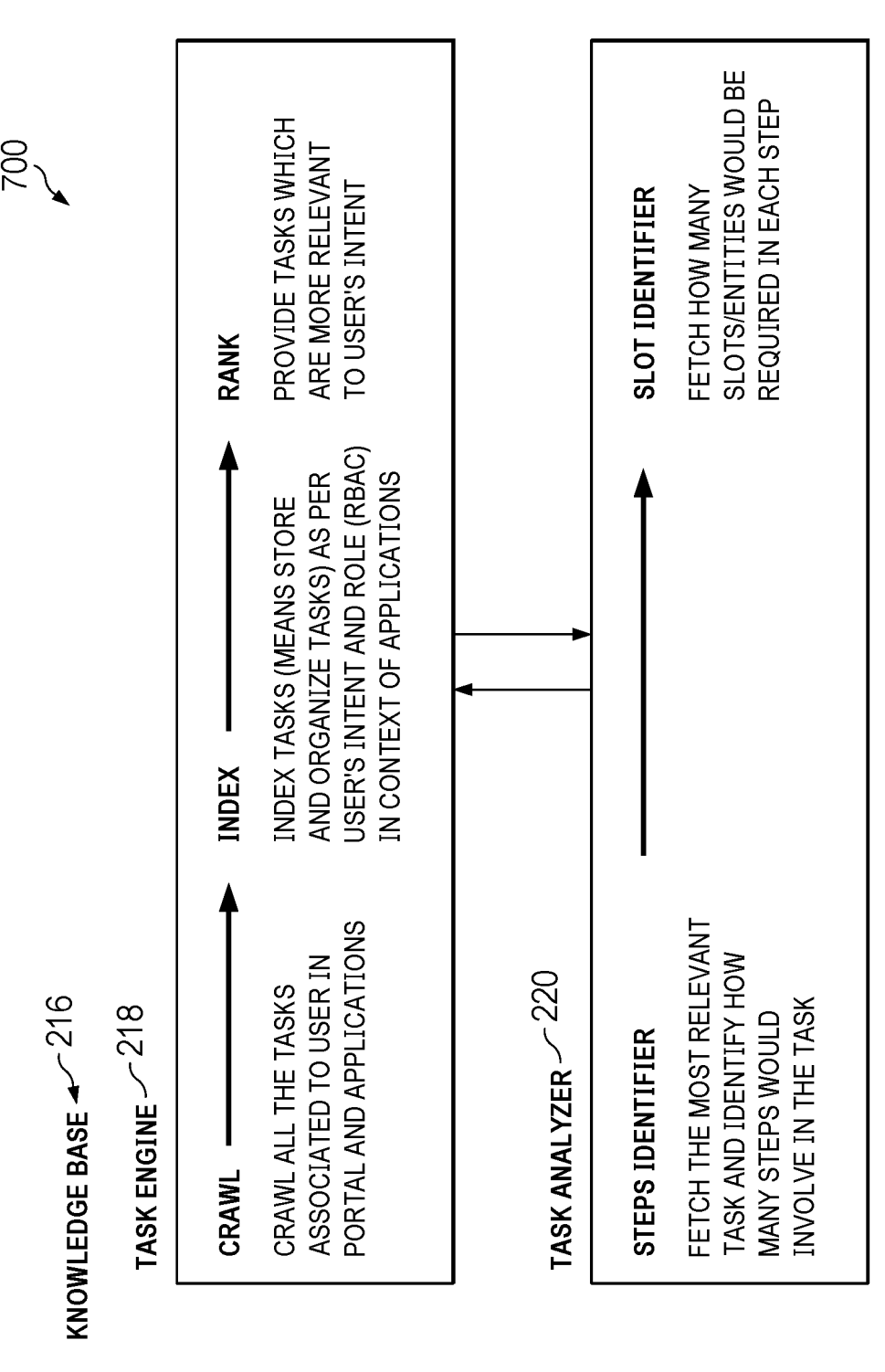
FIG. 7 illustrates a workflow for the task engine and the task analyzer of the knowledge base, according to an embodiment.

FIG. 7 illustrates workflow 700 for task engine 218 and task analyzer 220 of knowledge base 216, according to an embodiment. As disclosed above, knowledge base 216 may comprise task engine 218 and task analyzer 220. Task engine 218 crawls the tasks associated to a user in access portal 302, GUI, or application, indexes the tasks by, for example, storing and organizing task definitions according to the one or more intents that initiate the task. In addition, embodiments of task engine 218 rank tasks according to how well they correspond with a user intent. By way of example only and not by way of limitation, after a user logs in through the client portal, task engine 218 generates a list of tasks by crawling the tasks associated with a particular user (e.g., a history of usage and responsibilities) and portal (e.g., other tasks the client portal and applications may support). Task engine 218 may then index the tasks according to user intent. In one example, a user may query to show all the orders, and, in response and based, at least in part, on the user, task engine 218 indexes the tasks available to the user and which are related to orders in the application's context, followed by sharing the most relevant tasks and/or actions associated to the user's intent.

Task analyzer 220 fetches the task most relevant to the user intent and determines number of steps 604 to complete the task and the slots or entities used by the task at each step. Continuing with the previous example of a category assortment planner and a create activity, the task analyser determines that this would require two steps: first to select category and subcategories (slots); and second to define details related to reviewers, analyst (slots), and the like.

Figure 8:
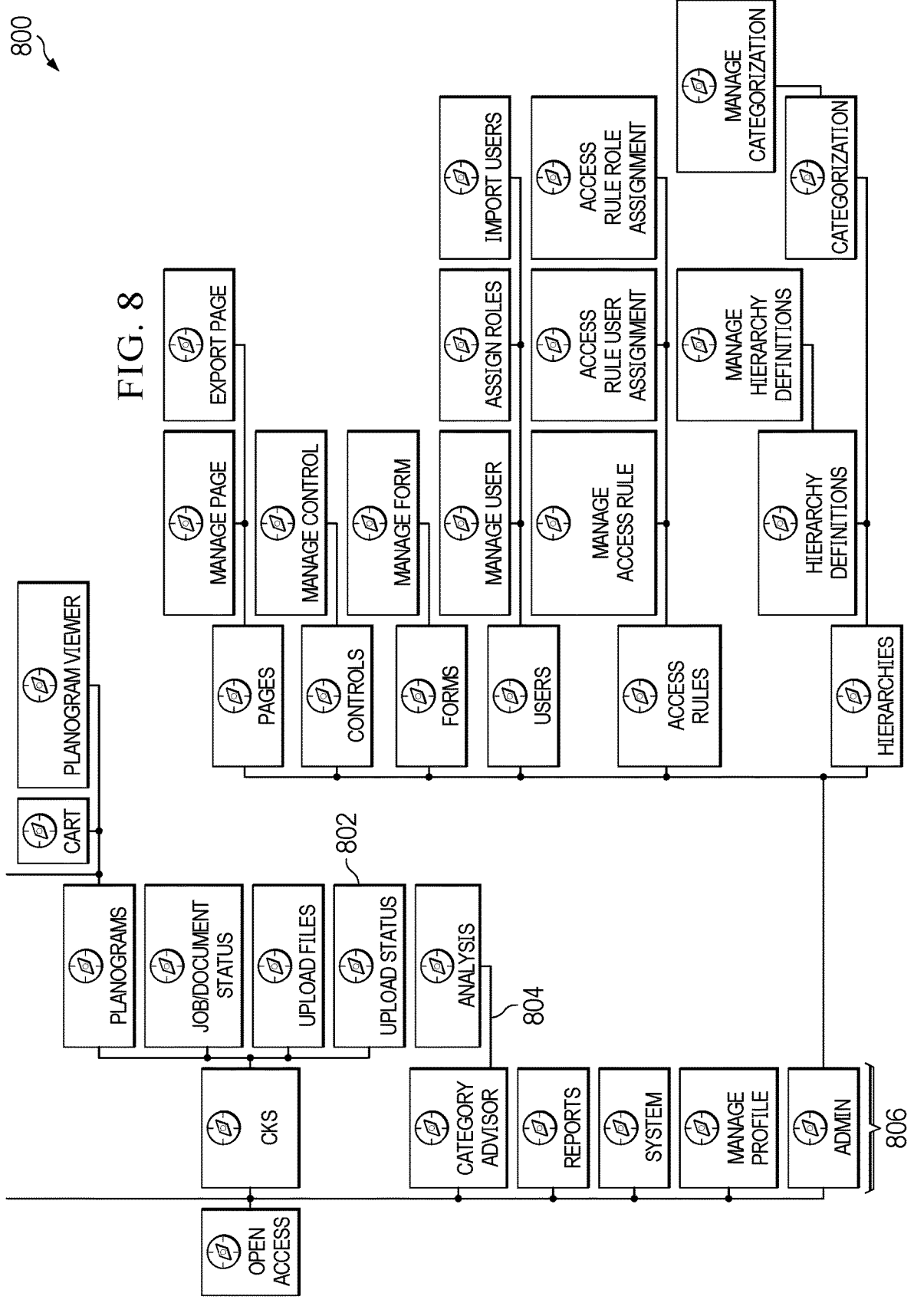
FIG. 8 illustrates a category management information navigational flow, according to an embodiment.

FIG. 8 illustrates category management information navigational flow 800, according to an embodiment. The category management information navigational flow 800 maps the flow of information through applications or solutions controlling transportation network 120, warehouse management system 130, inventory system 140, and supply chain planner 150, such as, in this example, a category management solution, OPEN ACCESS. Each of nodes 802 of category management information navigational flow 800 correspond to data locations, functions, actions, layouts, screens, and/or modules which a user may view and perform tasks related to. Arcs 804 connecting nodes 802 indicate available or potential navigational paths from each node. In addition, or as an alternative, navigations may comprise jumping, canceling, or choosing another path using side (and/or predefined portal) navigations.

Each of nodes 802 and arcs 804 are located in one or more levels 806 of a hierarchy which may correspond to organization of the GUI. Although category management information navigational flow 800 is shown as comprising a particular number and configuration of nodes 802, arcs 804, and levels 806 for a category management solution, embodiments contemplate an information navigational flow having any number and configuration of nodes 802, arcs 804, and levels 806 for an interface visualization of any transportation network 120, warehouse management system 130, inventory system 140, supply chain planner 150, or any system accessed through a user interface, according to particular needs.

Figure 9:
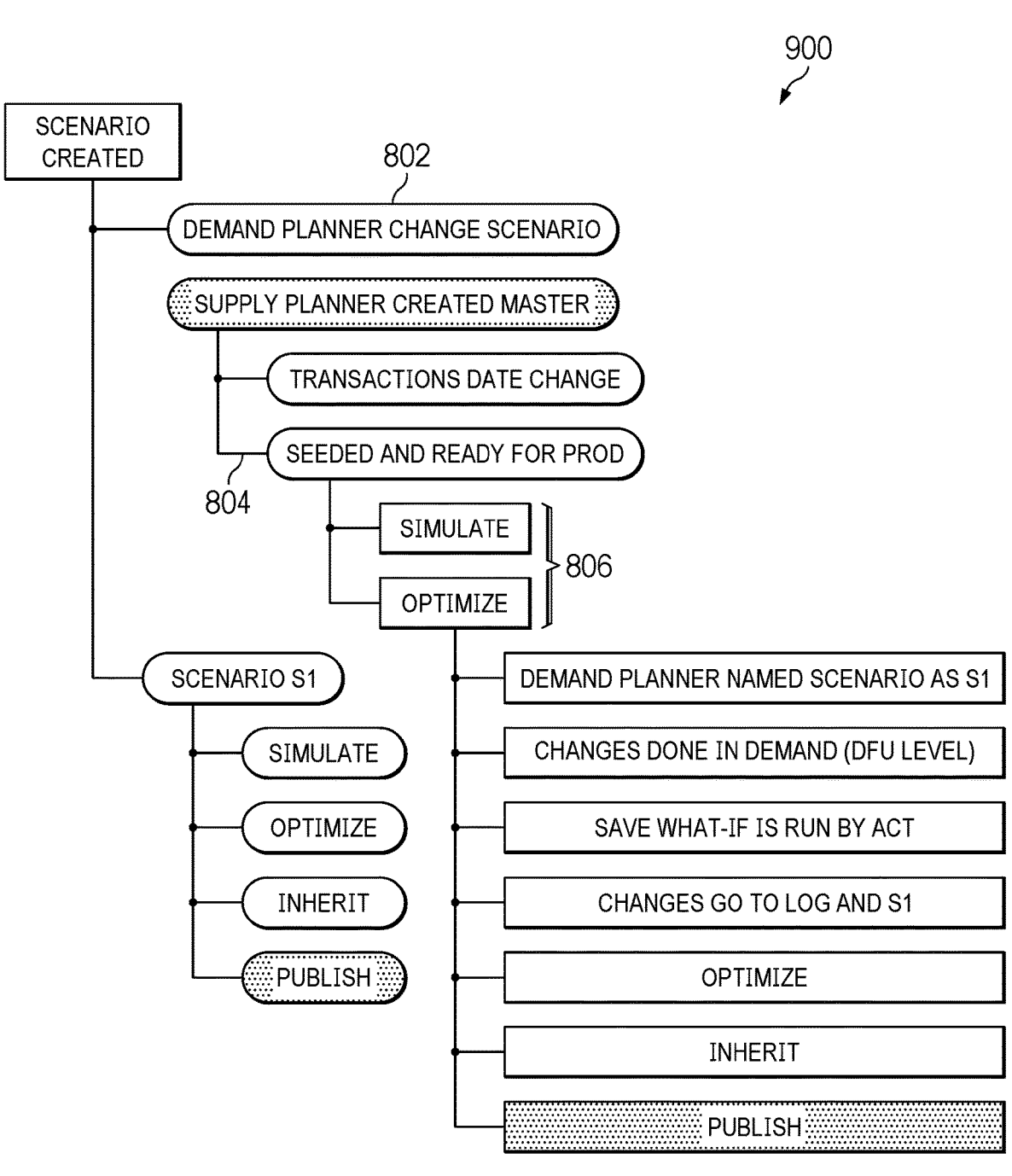
FIG. 9 illustrates a scenario creation task information navigational flow, according to an embodiment.

FIG. 9 illustrates scenario creation task information navigational flow 900, according to an embodiment. Scenario creation task information navigational flow 900 for the scenario creation task comprises nodes 802 connected by arcs 804 organized in one or more levels 806 of a hierarchy, as disclosed above. This example illustrates the complexity of navigating between locations of the actions needed to complete even a single task, here, an example scenario creation task. In addition, completing these tasks is further impeded by the crowded and data-rich supply chain planning user interfaces that require excessive navigation and clicking, each of which may be followed by visual or audio feedback, further distracting and impeding user productivity. As disclosed above, some specially-abled users may rely on one or more plugins that provide screen reading, key tap, talk back, or other accessibility options. In addition, power users may also rely on plugins that address the problem of information overload and accessibility. To overcome the limitations of these plugins, navigation system 110 identifies a predefined or formulated task from a user intent. Navigation system 110 generates a potential navigation in a context-specific manner, such as, for example, based, at least in part on, user profiles 242, navigation history 244, current location within the interface, currently displayed data, and the like. Navigation system 110 may be used with, for example, supply chain planner 150 for an apparel retailer, a warehouse manager, a transportation manager, and the like. In each of these example scenarios, the planner or manager may accomplish tasks by navigating and performing actions along a particular path of scenario creation task information navigational flows 900 or one or more decision trees 238. As described in further detail below, recommendation engine 224 may calculate a confidence score indicating the likelihood of the recommendation matching the intended action or navigation. Some embodiments of recommendation engine 224 continue to monitor the actual actions and navigations initiated by the user, monitors for correct and/or incorrect recommendations, and updates the learning model to improve future recommendations.

To complete a task, the user may be required to generate user inputs 502 to the user interface to execute a task at one level of the hierarchy, navigate to a node in a different level of the hierarchy, perform an action at the node, navigate to a second node (which may be in the same or different level of the hierarchy), perform an action at the second node, and iteratively perform actions and navigations until all steps of the task are completed. Even for the simplified examples of the information navigational flow for a GUI displaying a category management application or a scenario creation task, completing tasks requires complex or excessive navigations. Notably, most transportation networks 120, warehouse management systems 130, inventory systems 140, and supply chain planners 150 comprise a navigation informational flow much larger and more complex than the simplified category management and scenario creation task examples provided above.

To improve navigation, in some embodiments, navigation system 110 provides hotkeys or keyboard shortcuts for navigation and actions. The hotkey or keyboard shortcuts for navigations are executed by user input 502 of the hotkey or keyboard shortcut, and, in response to user input 502, the user interface moves a cursor or current selection (such as a current selection of an object of the GUI). Although navigations are shown and described as changing the selection in the GUI, from the currently-selected object to an object in a different location, such as, for example, locations of a single zone, between locations of two or more zones, of one zone to another zone, or between or among any number of locations within the GUI, according to particular needs.

Figure 10:
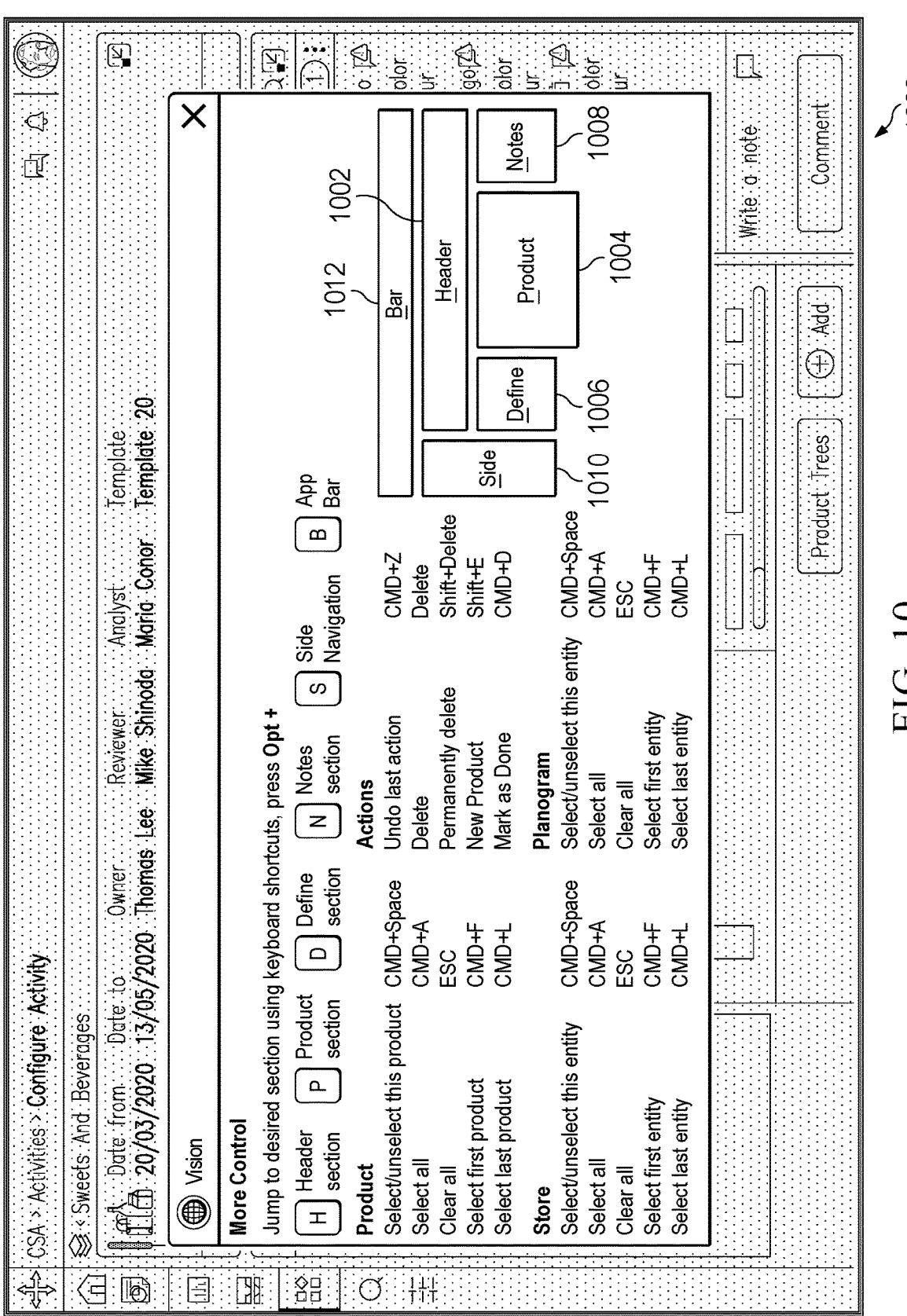
FIG. 10 illustrates an example layout for an interface having a card-based design, according to an embodiment.

FIG. 10 illustrates example layout 1000 for an interface having a card-based design, according to an embodiment. The example layout 1000 comprises the following zones: header section 1002, product section 1004, define section 1006, notes section 1008, side navigation 1010, and app bar 1012. Although the example layout 1000 is shown and described as comprising a particular number and arrangement of zones, embodiments contemplate any suitable arrangement or number of these or other zones, according to particular needs.

Figure 11:
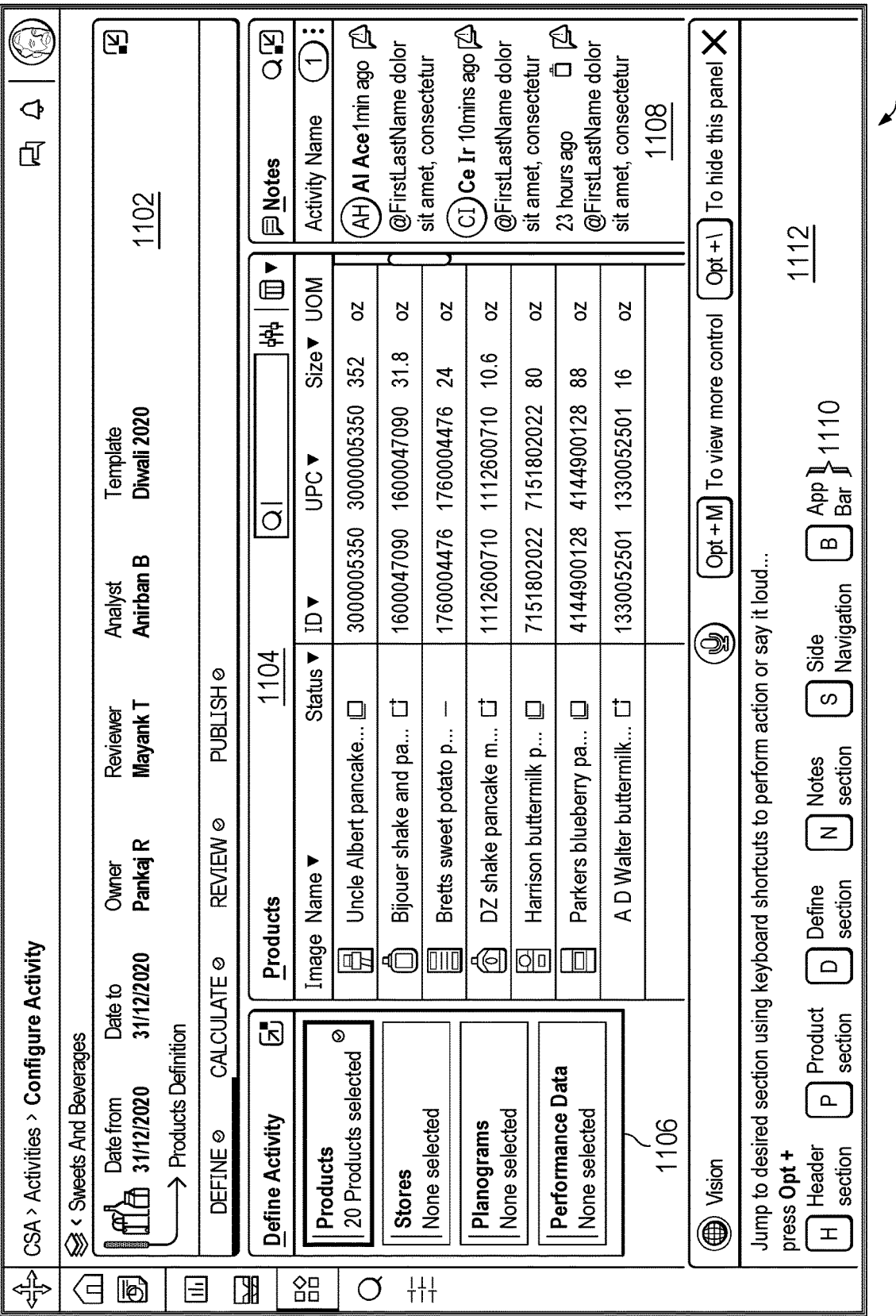
FIG. 11 illustrates a card-based interface design, according to an embodiment.

FIG. 11 illustrates a card-based interface design, according to an embodiment. As disclosed above, the card-based design divides the user interface into different zones. However, based on the amount of information presented, navigating from one zone to another zone using a screen reader will be distractingly noisy based on the large amount of text and graphical elements located in the various zones. In the illustrated embodiment, top zone 1102 comprises header section 1002 where activities and information are defined; middle zone 1104 comprises products section 1004, where the available products are displayed, edited, selected, created, and the like; selection within left zone 1106 define the scope of middle zone 1104, which may be, for example, stores, planograms, performance data, or products. By way of example only and not by way of limitation, a keyboard shortcut (such as, for example, navigating between elements using a tab key of a keyboard) requires more than twenty user inputs 502 to navigate from the sweets and beverages header of top zone 1102 to notes section 1006 in right zone 1108. When a screen reader or other accessibility tool 226 is active, navigation using a tab key or arrow key causes computer 180 to generate a droning noise caused by reading each word along the navigation path, which is annoying and distracting for power and specially-abled users, who may rely on these tools. In the current embodiment, navigation system 110 improves navigation and task completion using hotkey and keyboard shortcuts 1110 which are displayed on floating panel 1112 of the GUI and which automatically update.

In response to user input 502 of hotkey or keyboard shortcuts 1110 for executing an action, the user interface executes the action associated with user input 502. In one embodiment, the user interface displays hotkey or keyboard shortcuts 1110 for all actions for the current zone (e.g., the zone where the cursor or a current selection is located). In addition, the user interface may display only some of hotkey or keyboard shortcuts 1110 for navigations based on the current zone. In addition, or as an alternative, hotkey and keyboard shortcuts 1110 for actions and navigations are updated based on the properties of the currently-displayed data (such as, for example, many of the actions for product data 264 would be different than actions for scenarios), the currently occupied zone or part of the zone (such as, for example, the search bar, a text input element, selected text, or other interface input or design element), available actions for the current selection, the current zone, a part of the zone where the current selection or cursor is located, and the like. A user of this GUI may simply jump to the products section 1004 by input of the keyboard shortcut OPT+P, or by providing any equivalent natural language input, such as, for example, providing a voice input interpreted by NLP engine 214 as equivalent "I want to go to the products section." Using navigation system 110, the user interface provides for navigating quickly from zone to zone, executing available actions, and dynamically altering the order and type of the recommended actions based, at least in part, on the context of the current zone.

Navigation system 110 may generate audio or visual feedback, in response to a user action or navigation. Audio feedback may comprise, for example, spoken language generated by one or more digital speakers and announcing the type or result of the navigation or action that was executed. In addition, or as an alternative, visual feedback may be displayed by the user interface. Visual feedback may comprise, for example, text indicating the type or result of the navigation or action that was executed, such as, for example, "you've selected the middle section card P," displayed in response user input 502 ting hotkey or keyboard shortcut 1110 for middle zone 1104. Visual feedback may further comprise displaying graphical user elements to highlight or mark the location of the current selection or the result of an action, which may include, but is not limited to, outlining, highlighting, lightening, shading, or any other visual modification to the appearance of the graphical user element indicating the location or result of the action or navigation. In addition, the panel or card visualization comprising the hotkeys and keyboard shortcuts 1110 may be hidden or removed in response to user input 502 (here, Opt+\). To view more controls, user input 502 may comprise (Opt+M). Although particular user inputs 502 are shown and described for particular actions, and navigations embodiments contemplate any suitable user input 502 to access any action or navigation, according to particular needs.

Figure 12:
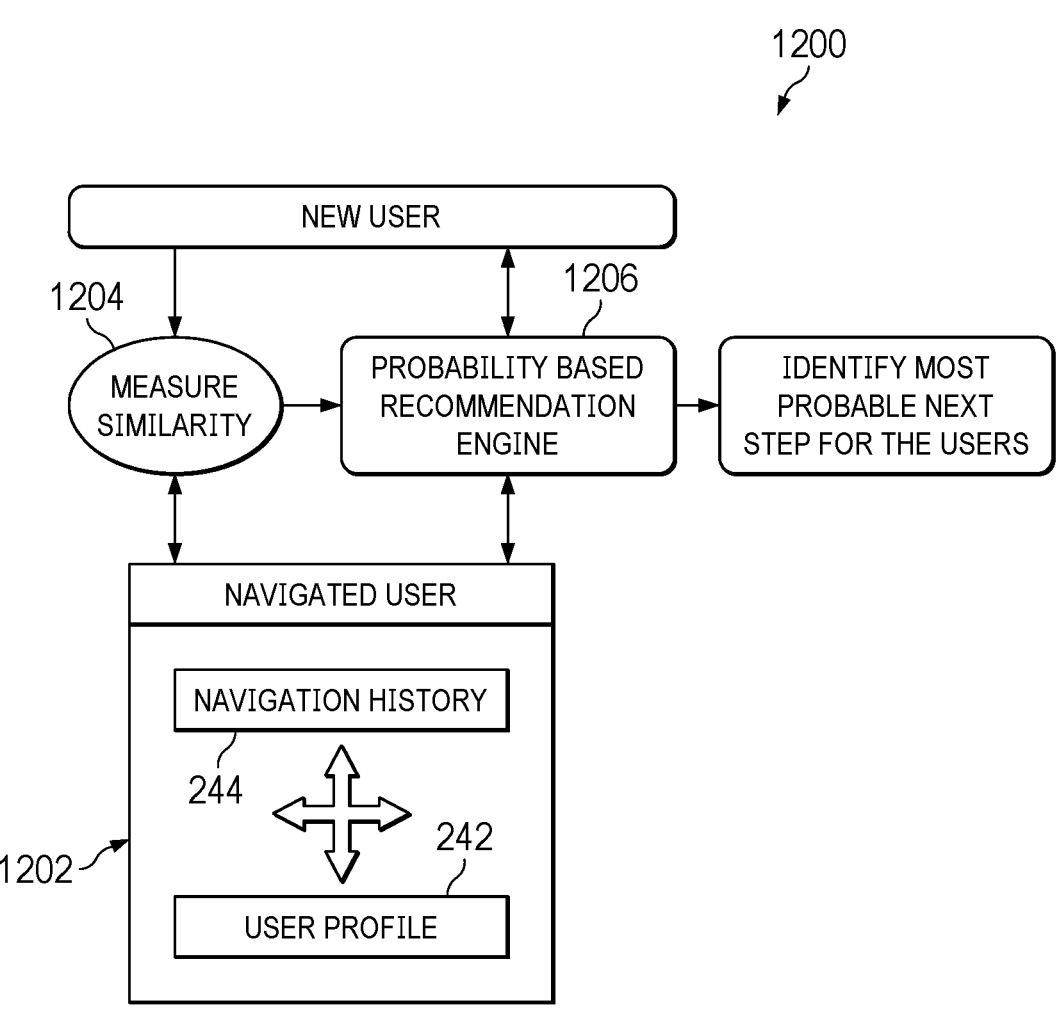
FIG. 12 illustrates a flow diagram of intelligent navigation, according to an embodiment.

FIG. 12 illustrates flow diagram 1200 of intelligent navigation, according to an embodiment. Flow diagram 1200 illustrates a method that comprises one or more activities, which although described in a particular order may be implemented in one or more combinations, according to particular needs.

At activity 1202, navigation system 110 generates navigation history 244 and user profiles 242 of one or more users of navigation system 110. As disclosed above, navigation history 244 and user profiles 242 are historical data, which may be collected from any of transportation network 120, warehouse management system 130, inventory system 140, supply chain planner 150, or any other business process. By way of example only and not by way of limitation, user profiles 242 data may comprise, for example, demographics, job title, role, customer/account type, industry, vertical, geographical information (region, location, etc.), age, sex, platform devices, working shifts, usage, average time on the application, frequency of use, peak time of usage, low time of usage, time spent on one or more of the portal, apps, applications, pages, and the like, unique page visits, frequency of pages visited, clicks on features/actions, unique features clicked, frequency of features clicked, ideal time on pages, user's path, a sequence of events (features and pages) that users interacted with before or after a target event, time taken for each step-in sequence, and the like. By way of example only and not by way of limitation, attributes for navigation history 244 may comprise, for example, a list of web pages a user has visited as well as associated data such as page title and time of visit, a type, nature, or other category associated with pages, features, and the like, a number of visitors (unique, repetitive, etc.), time spends per each of the pages, click on features from the pages, last time visited/clicked, visited by users, user profiles 242, usage path (a sequence of events before and after a funnel e.g., a series of steps through an App that a user is expected to engage in sequence, defined from functional workflow 514 and service point of view), and the like. Although particular items are described in connection with user profiles 242, navigation history 244, or both, embodiments contemplate any suitable items of any type of historical data being utilized as user profiles 242, navigation history 244, or both, according to particular needs.

At activity 1204, similarity engine 222 calculates a similarity score for a user. According to embodiments, similarity engine 222 calculates the similarities of actions and navigations between one or more different users or between the same user at different times. Embodiments contemplate any suitable method to calculate similarity scores, such as, for example cosine, Jaccard, mathematical formulas, and the like.

At activity 1206, the recommendation system uses probabilistic matrix factorization to suggest probability-based recommendations. After determining the similarity score, recommendation engine 224, uses the probabilistic matrix factorization, to generate recommendations 240.

FIG. 13 illustrates similarity metrics example 1300, according to an embodiment. By way of example only and not by way of limitation, similarity metrics example 1300 are given in connection with "wiki" pages 1302*a-b* for Sachin Tendulkar and Dhoni, and a subsection of Dhoni wiki page 1302*b*. Considering only the words, Dhoni, Cricket, and Sachin, similarity engine 222 constructs term matrix 1304 with counts and calculates similarity (or distance) metrics 1306 for each pairwise combination of the three terms. Although the example is given for wiki pages, embodiments contemplate calculating similarity metrics 1306 for any term or combination of any number of terms, according to particular needs.

Figure 14:
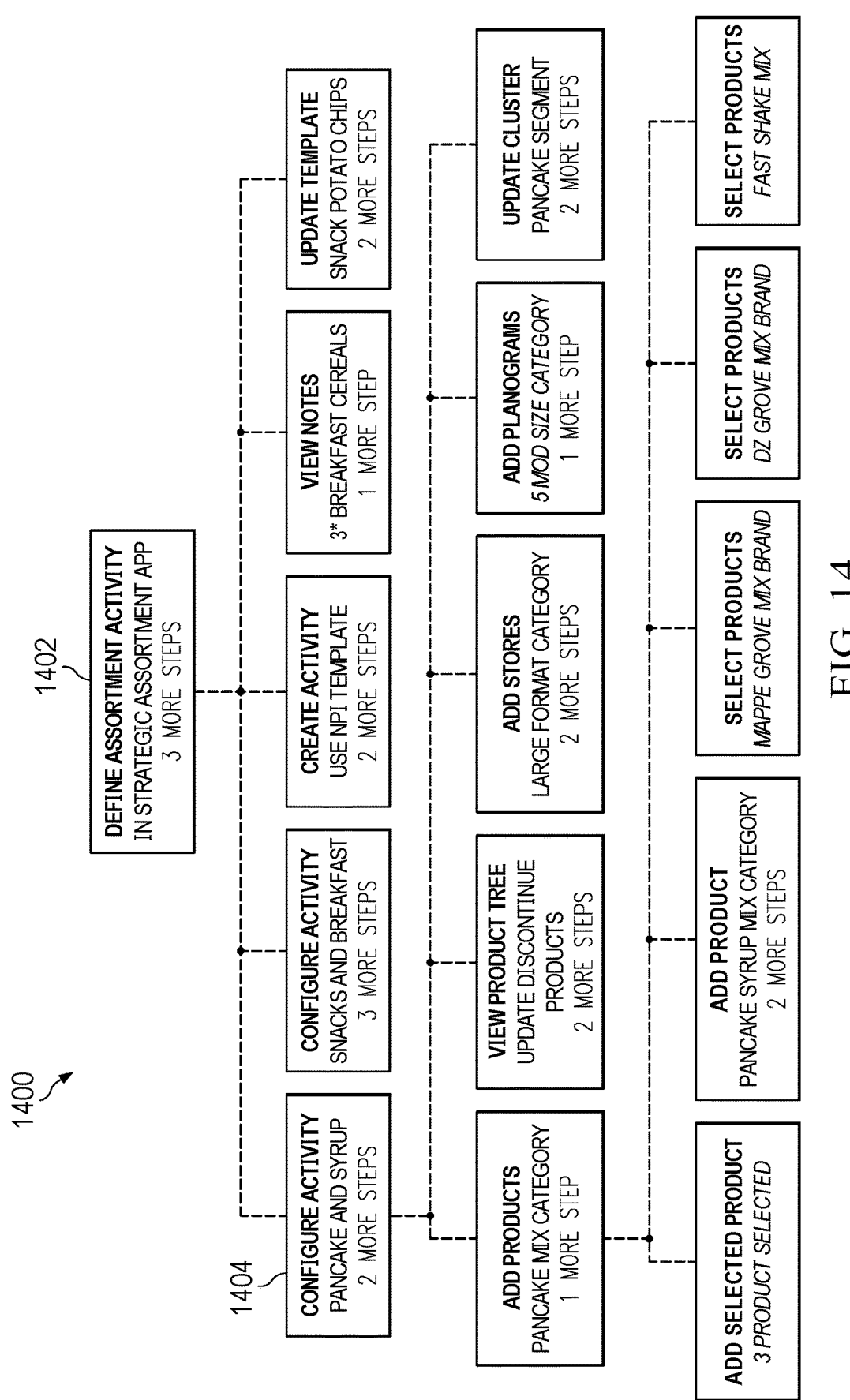
FIG. 14 illustrates an example decision tree for example assortment planning tasks, according to an embodiment.

FIG. 14 illustrates example decision tree 1400 for example assortment planning tasks, according to an embodiment. Example decision tree 1400 comprises assortment planning tasks organized by current task 1402, at the top, followed by a first set of five recommended tasks 1404 in the next level. The five recommended tasks 1404 comprise the top five recommendations generated by recommendation engine 224 for the user in response completing the first task. Each of the tasks indicates number of steps 604 needed to complete the tasks. The five recommended tasks 1404 in each of the next two levels are, similar to above, the top five predicted recommendations for the user after completing a particular task in the previous level. Because the recommended tasks 1404 are based on probability, there may be greater or fewer recommendations at each level, depending on the confidence associated with each predicted task. Although example decision tree 1400 comprises four levels with sixteen tasks, embodiments contemplate decision trees 238 having any number of predictions organized into any hierarchy or relationship. This example is highly simplified from the complexity that would be needed to represent tasks of a real-world supply chain planning application.

Figure 15:
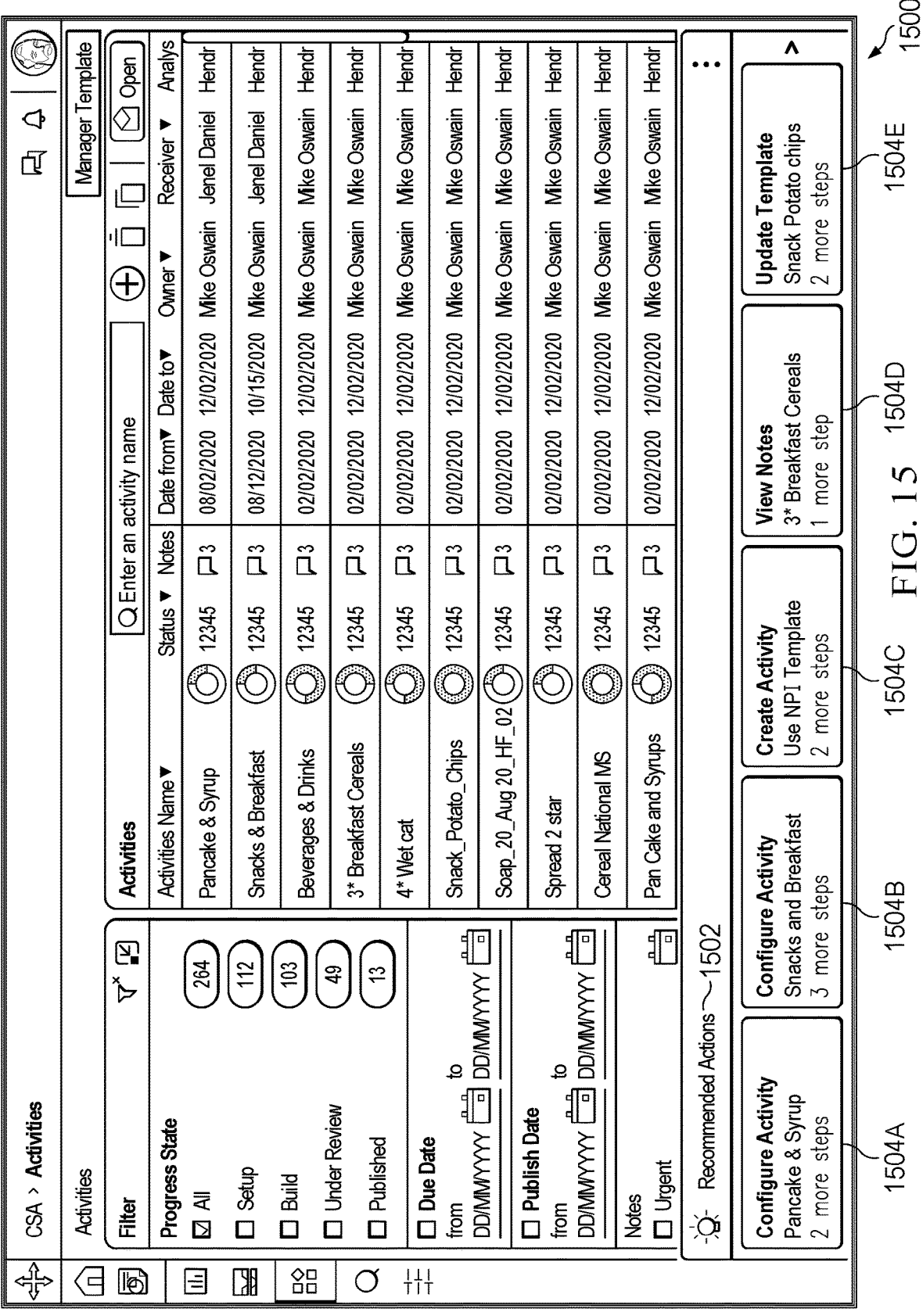
FIG. 15 illustrates a user interface visualization comprising "Activities" for a category management assortment planner, according to an embodiment.
Figure 16:
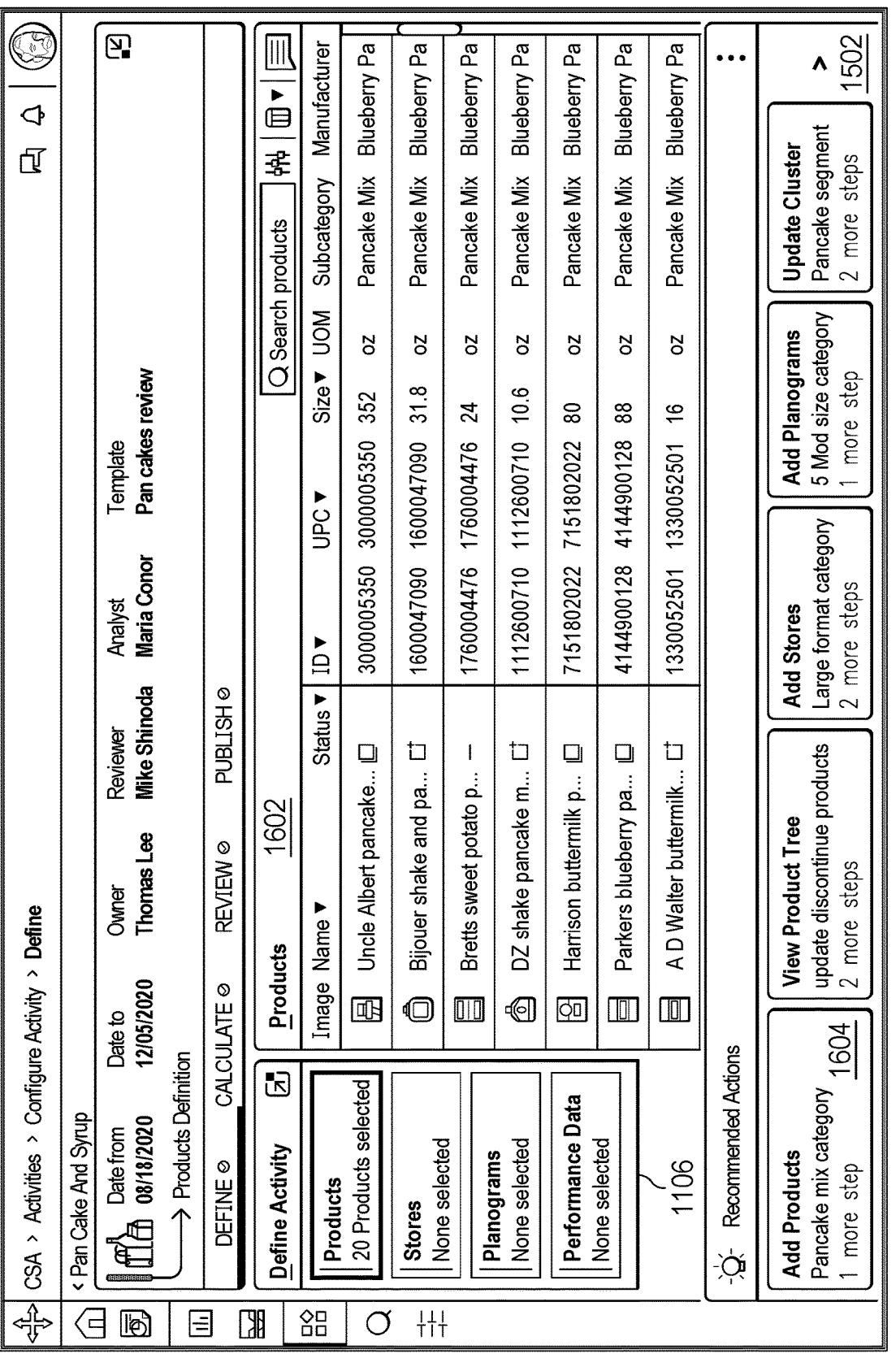
FIG. 16 illustrates an updated set of recommendations based on the previous actions taken by the user, according to an embodiment.
Figure 17:
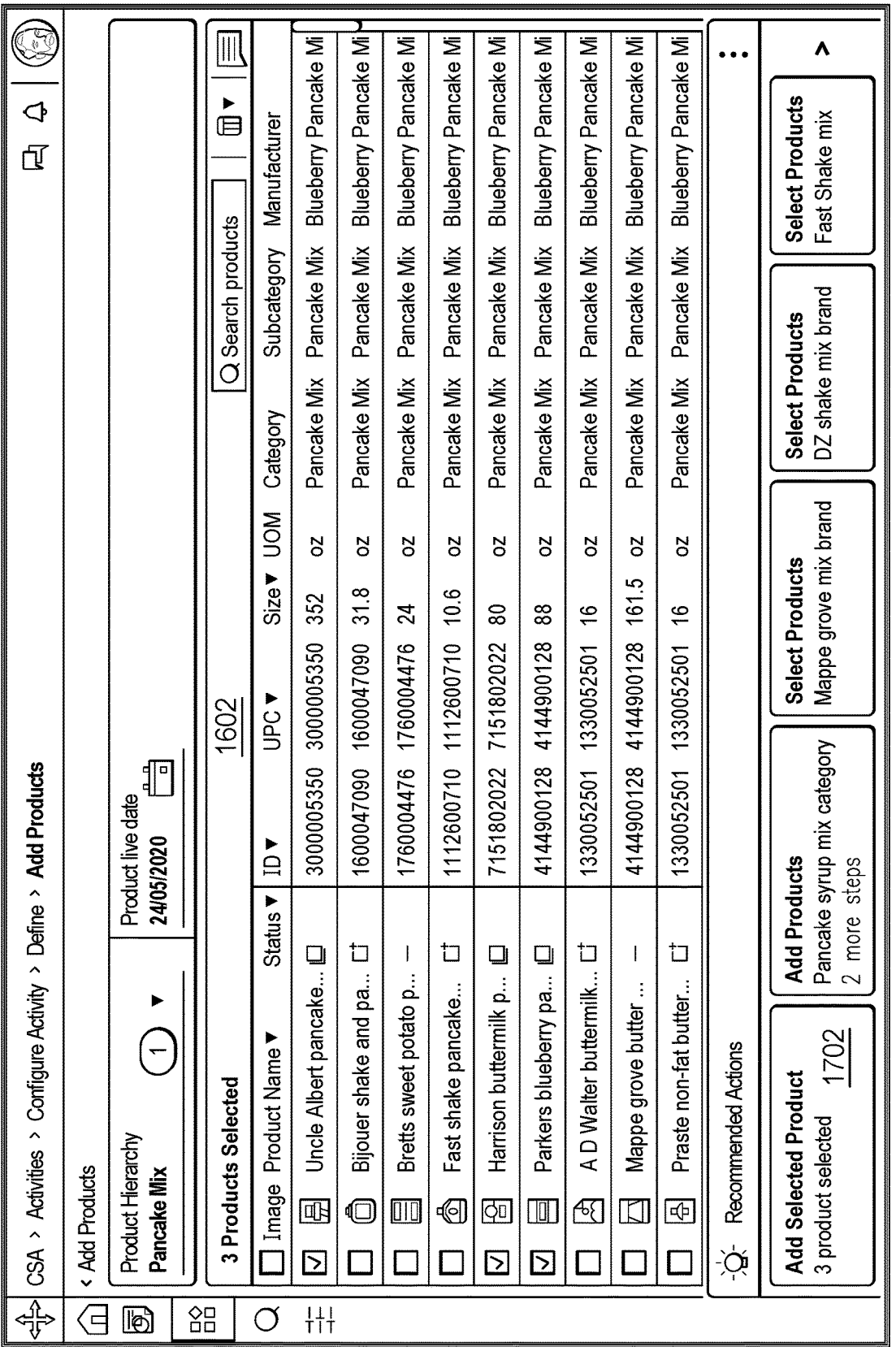
FIG. 17 illustrates a select product user interface visualization, according to an embodiment.

FIGS. 15-17 illustrate user interface visualizations using a card-based design and recommended actions, according to a first embodiment having unranked recommendations.

FIG. 15 illustrates user interface visualization 1500 comprising "Activities" for a category management assortment planner, according to an embodiment. The user interface displays recommendations panel 1502 in connection with the card-based layout. Recommendations panel 1502 displays a selection of actions or tasks which have the highest probability of being selected by the user. In the illustrated embodiment, the recommendations panel 1502 comprises five selectable elements 1504*a-e*, each comprising a description of a task that will be executed in response to user selection of the element as well as number of steps 604 needed to complete the task. Continuing with the example of the illustrated embodiment, the first recommended task is "Configure Activity" task 1504*a* for pancakes and syrup, the second is "Configure Activity" task 1504*b* for snacks and breakfast, the third is "Create Activity" task 1504*c*, the fourth is "View Notes" task 1504*d* for particular breakfast cereals, and the fifth task is "Update Template" task 1504*e* for potato chips. Although recommendations panel 1502 comprises five recommended tasks 1504 with various numbers of steps and is shown as a panel floating over the bottom of the user interface visualization, embodiments contemplate recommendations panel 1502 having any number of recommended tasks 1504, actions, navigations, or the like and located in any suitable display area of the user interface visualization, according to particular needs. In the illustrated example, recommendation engine 224 has generated predictions based, at least in part, on the due date or publish dates for upcoming or previously-started tasks need to be completed. Additional contextual data 236 that was relied on by recommendation engine 224 may include, for example, where the user had navigated previously, where the user is currently navigating, and a comparison of those navigations with the same or other users.

FIG. 16 illustrates updated set of recommendations 1600 based on the previous actions taken by the user, according to an embodiment. After viewing the previous set of recommendations, the user selected Configure Activity" task 1504a for pancakes and syrup. In response to, and based at least in part on, the user selection of this recommendation, the user interface displays pancake and syrup products that have been recently added to product tree 1602 as well as a new set of recommended tasks in recommendations panel 1502. By way of example only and not by way of limitation, the illustrated embodiment shows products that may be added, removed, or configured for the assortment that is being planned. On left zone 1106, the user may navigate to stores and add some store. In the alternative, the user may select the third recommendation to complete the activity. In addition or as an alternative, the user interface displays selectable elements for creating planograms and updating clusters. These tasks may also be completed by selecting the appropriate recommendation and executing the actions at each of the steps. Because the completion of the product assortment is needed before continuing to creating planograms and updating clusters, the recommendation system has correctly identified the most likely task is the first one in recommendations panel 1502, "Add Products" task 1604.

FIG. 17 illustrates select product user interface visualization 1700, according to an embodiment. In response to user selection of the "Add Products" task 1604 of updated set of recommendations 1600, the user interface displays a list of products that may be potentially added to the current product tree 1602. Products 1602 that are displayed are based on the context of the user navigating to the add products task, including in which group the user is assigned and what task the user is attempting to perform. Embodiments contemplate automatically adding or selecting products based on these and other contextual data 236. The user may then click the first recommendation, "Add Selected Product" task 1702, to complete the task according to the recommendation to add to the current activity.

Figure 18:
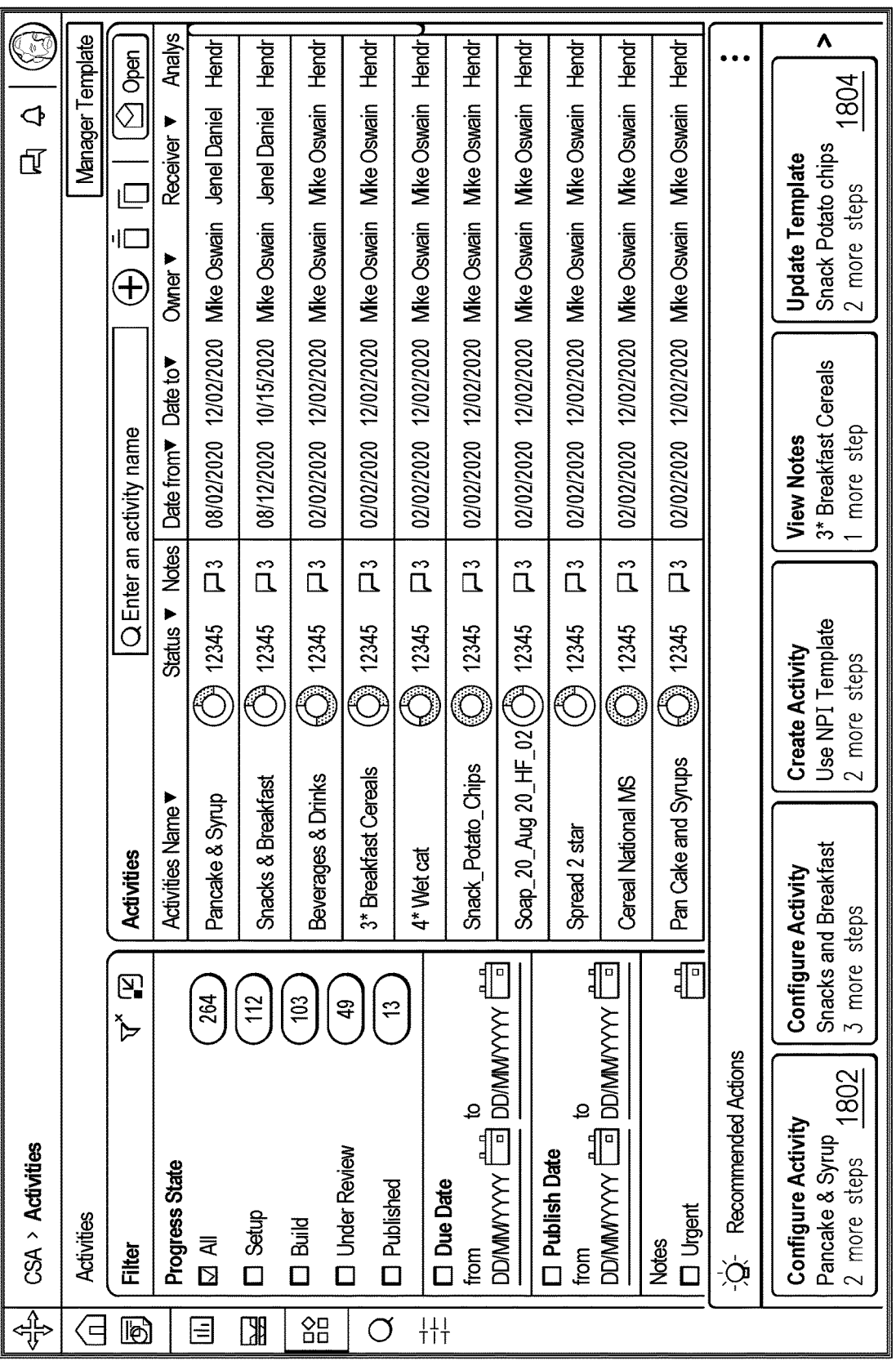
FIG. 18 illustrates a confidence-ranked recommendation GUI, according to an embodiment.

FIG. 18 illustrates confidence-ranked recommendation GUI 1800, according to an embodiment. FIG. 18 illustrates a user interface visualization using a card-based design and recommended actions, according to a second embodiment having recommendations ranked according to a calculated confidence measure. In the illustrated embodiment, the confidence of the recommendation is indicated by the darkness of the shading of the button representing the recommendation.

Continuing with this example, leftmost recommendation 1802, shaded the darkest, represents the recommendation having the highest confidence, whereas rightmost recommendation 1804, shaded the lightest represents the least confidence. The recommendations having intermediate shading represent intermediate confidence in those recommendations. In addition, or as an alternative, user selection of the arrow (to the right of rightmost recommendation 1804) causes the user interface to display a visualization comprising one or more additional recommended actions. Embodiments contemplate showing these additional activities in any suitable order, such as, for example, by confidence, task group, alphabetical order, the number of remaining steps, and the like. Although the user interface visualization is shown and described as comprising five ranked recommendations, embodiments contemplate generating and displaying any suitable number of ranked or unranked recommendations, according to particular needs.

In some embodiments, the task associated with the user intent may require additional information to complete one or more slots or entities. As described in further detail below, the GUI displays a card visualization that prefills information identified from the user intent and provides input elements (e.g., a text box, drop down list, search bar, and the like) that receive information that was not identified from the user intent. By way of example only and not by way of limitation, an example of the card visualization, described in further detail below, is generated in response to a natural language input comprising an intent to create a scenario. In the example embodiment, the card visualization is displayed on the GUI in front of the currently displayed zones, but implementations may provide any suitable configuration or location of the create scenario task visualization, according to particular needs. Continuing with this example, the GUI may display a card visualization comprising a guided interface that displays one or more interactive visual elements providing for confirmation or modification of information decoded from the natural language input as well as one or more interactive visual elements providing for input of information which was not identified from the natural language input. The create scenario task visualization dynamically updates number of steps 604 needed to complete the task and guides a user from interface location to another interface location until the steps are completed and the new scenario is created.

Figure 19:
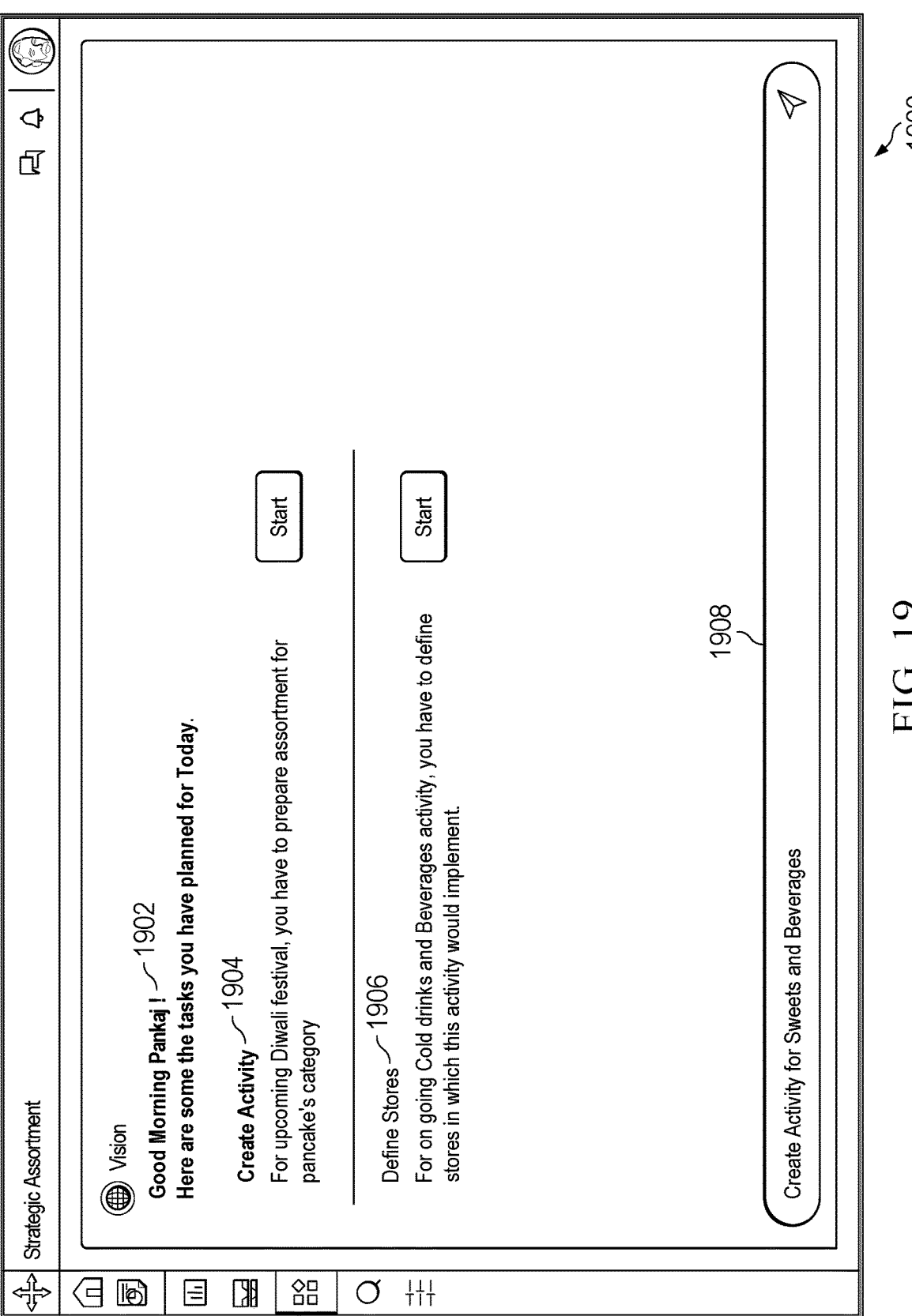
FIG. 19 illustrates a first example visualization of the user interface, according to an embodiment.

FIG. 19 illustrates first visualization 1900 of the user interface, according to an embodiment. As disclosed above, conversation interface 304 may display task list 306 assigned to current user 1902 interacting with the user interface. By way of example only and not by way of limitation, the illustrated example conversation interface 304 displays task list 306 with two tasks: creating an activity 1904 for the upcoming Diwali festival and defining stores 1906 for cold drinks and beverages. In response to user input 502 indicating selection of a task from task list 306 (e.g., clicking a start button that corresponds to the task), the interface system initiates the selected task. Although the task list 306 may be used to initiate a task that is currently assigned to the user, a task that is associated with the user's role, an in-progress or recurring task, or the like, task list 306 may not provide all or even many of the tasks available to the user or that might be beneficial to the user's role. In these cases, the user may simply type or speak a natural language input to conversation interface 304, which will decode the natural language input to determine the intent and match the intent to a definition for the intent in knowledge base 216.

The illustrated embodiment provides for a text or voice-based input using text input box 1908 at the bottom of first visualization 1900. A user may, for example, say or type "I need to create some activities for 'Sweets and Beverages" to initiate a task for defining sweets and beverages for a particular product assortment. Continuing with this example, conversation interface 304 may display a natural language response or a response comprising textual and graphical elements that indicates user input 502 was interpreted to initiate a create activity task for sweets and beverage products, this task will require two steps, and particular slots or entities are needed at each step, as described in further detail below.

Figure 20:
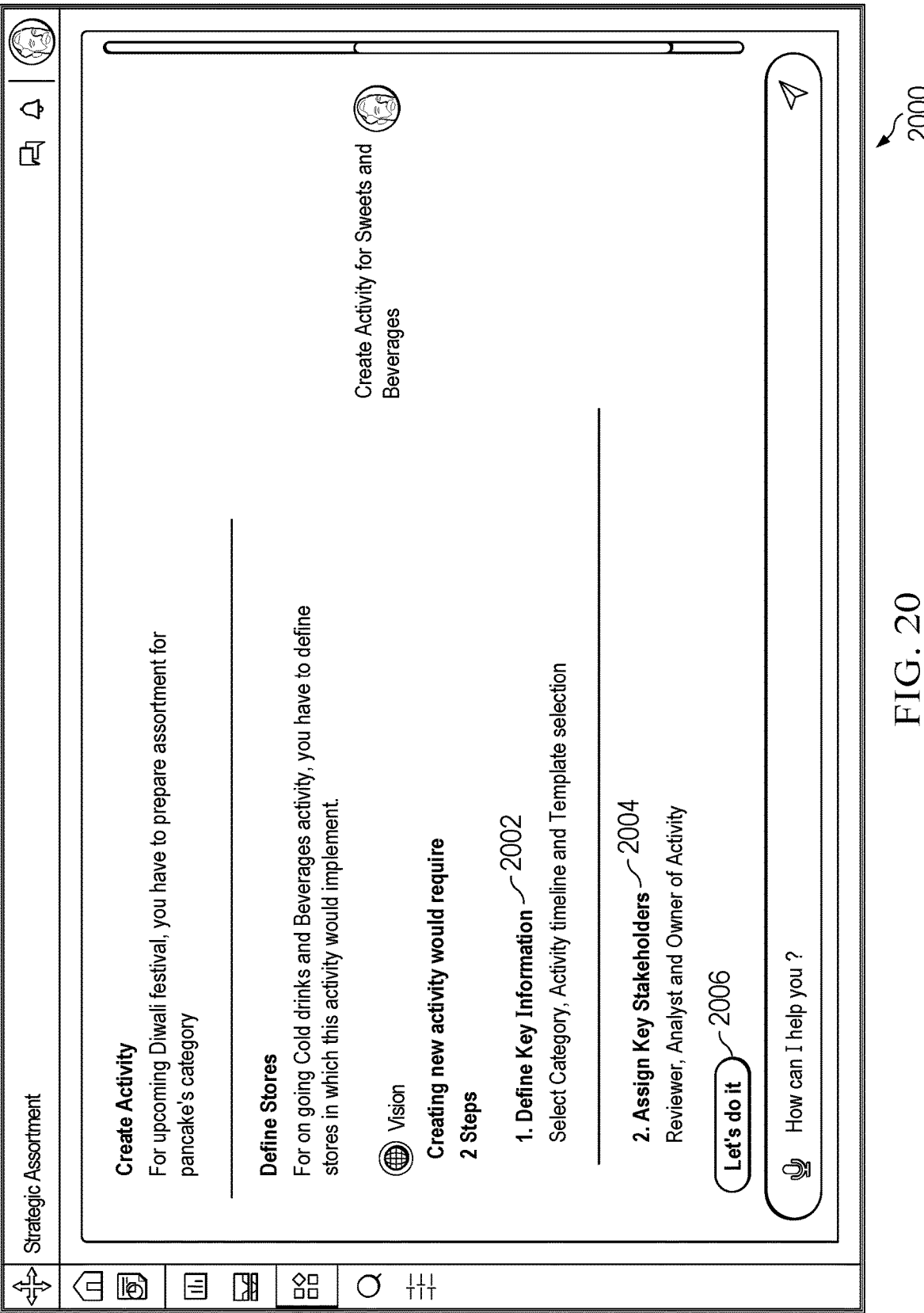
FIG. 20 illustrates a second example visualization of the user interface after identifying the tasks, steps, and/or slots assigned to each intent in the user input, according to an embodiment.

FIG. 20 illustrates second visualization 2000 of the user interface after identifying the tasks, steps, and/or slots assigned to each intent in user input 502, according to an embodiment. As disclosed above, knowledge base 216 receives the user intent after processing from NLP engine 214 and identifies the action most likely intended by user input 502.

Navigation system 110 determines the user's intent (or objective) by, at least in part, decoding the natural language input. NLP engine 214 classifies the information and displays for a particular task (such as, for example, the previously-described "creating activity for sweets and beverages" activity), the required steps, the quantity of steps, currently-input data, and/or missing data, needed to complete the task. By way of example only and not by way of limitation, conversation interface 304 displays, for the "create new activity" task, two steps: define key information 2002 and assign key stakeholders 2004. Conversation interface 304 displays, next to each step, the slots or entities that may receive or require a data input or selection. Continuing with the create new activity task example, navigation system 110 identified that the create activity task is for beverages and sweets, and the first step may receive or require selecting a category, an activity timeline, and a template, whereas the second step may receive or require assignment of a reviewer, analyst, and owner to the new activity. To begin the identified task, the user interface displays task initiation button 2006. According to the example embodiment, task initiation button 2006 is displayed next to the create activity task and comprises the text, "Let's do it." In response to user selection of task initiation button 2006, the user interface displays a prompt to the respective area and the user interface visualization displays an instructive step-by-step sequence of interactive visual elements, such as popups, text entry boxes, drop-down lists, search bars, selectable graphical elements, buttons, keyboard shortcuts 1110, and the like to execute one or more actions for each step of the task.

Figure 21:
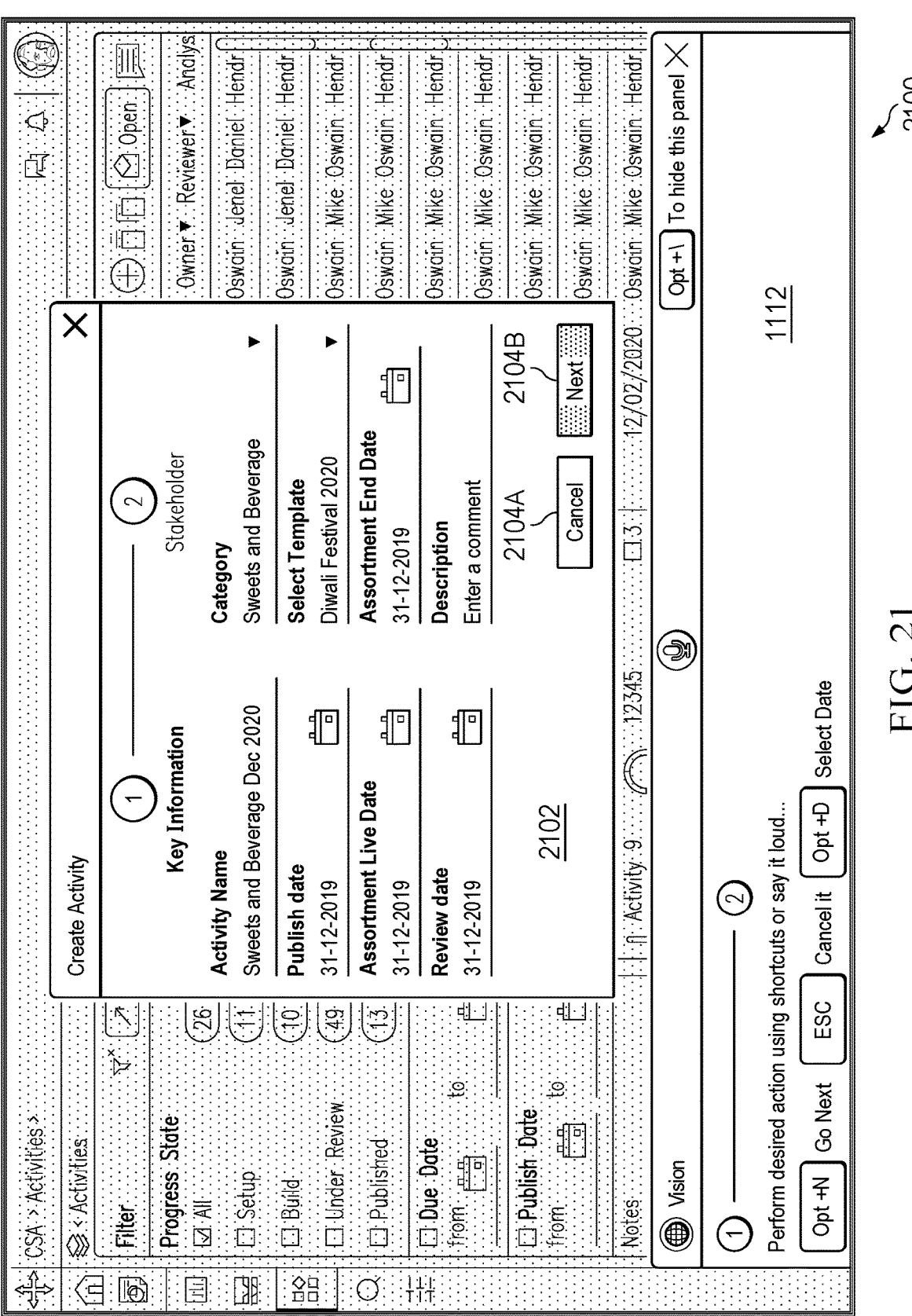
FIG. 21 illustrates a guided task navigation, according to an embodiment.

FIG. 21 illustrates guided task navigation 2100, according to an embodiment. As disclosed above, navigation system 110 receives or determines the quantity of steps needed to complete the intended task or action. Guided task navigation 2100 may, according to some embodiments, display each step on a different card. Guided task navigation card 2102 may be navigated by selecting interactive graphical elements (such as, for example, user-selectable buttons 2104a-b for cancel, next, and back) located on guided task navigation card 2102 and/or one or more hotkeys or shortcuts 1110 displayed on floating navigation panel 1112 of the GUI. At each step of guided task navigation 2102, the GUI may display a context-specific interactive visualization, such as, a card visualization, that provides interactive graphic elements for confirming and modifying slots or entities that were previously identified. In addition, the context-specific interactive visualization provides interactive graphic elements for creating or selecting slots or entities that are unidentified.

Figure 22:
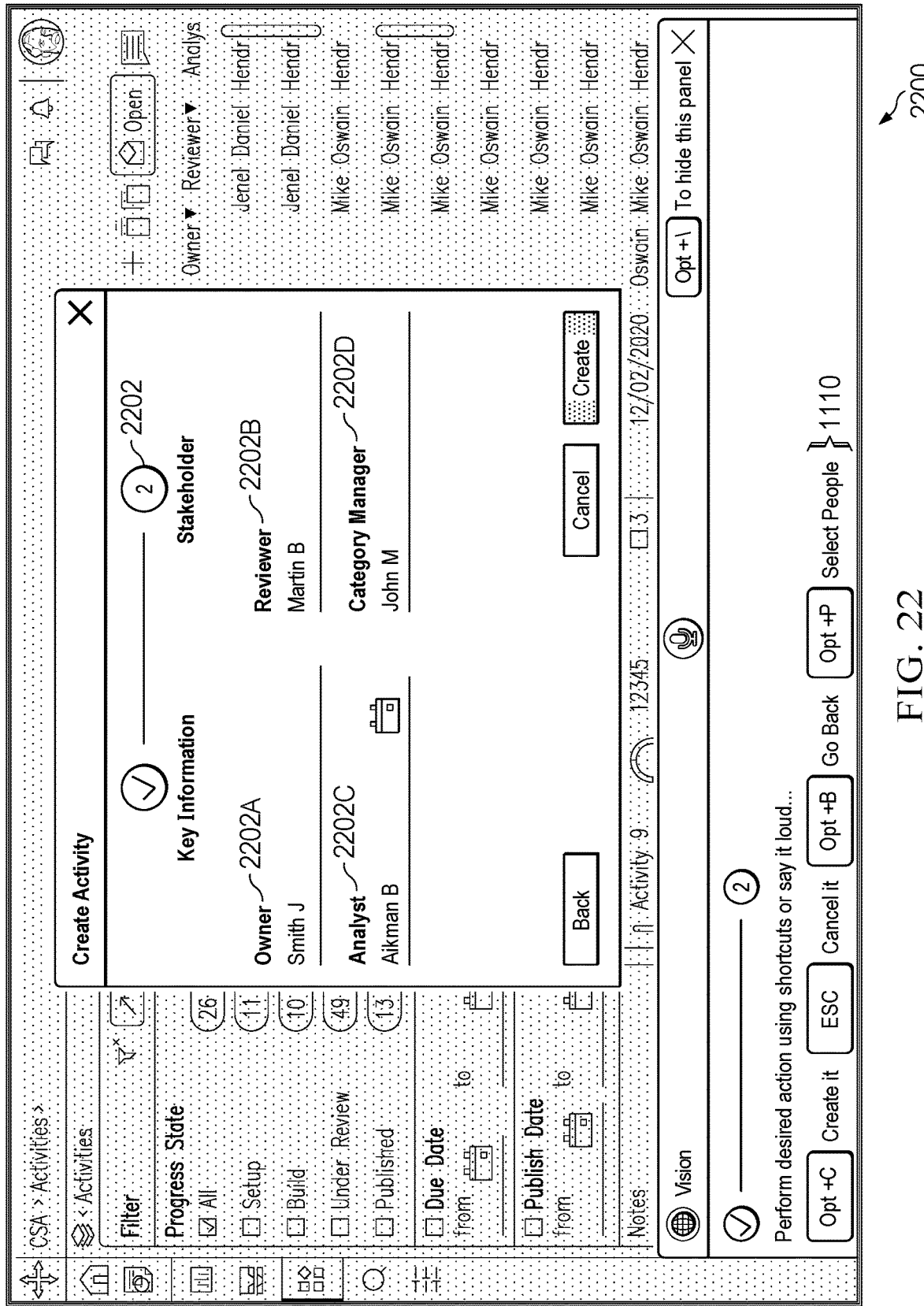
FIG. 22 illustrates the second step of the guided task navigation, according to an embodiment.

FIG. 22 illustrates second step 2200 of guided task navigation 2100, according to an embodiment. Second step 2200 of guided task navigation 2100 for the create activity task prompts the user for stakeholder information 2202. In one embodiment, the system interface receives one or more user inputs 502 to select owner 2204a, reviewer 2204b, analyst 2204c, and category manager 2204d. Embodiments may comprise automatic searching and input of users having appropriate roles for the stakeholders of the second task. In addition, hotkeys and keyboard shortcuts 1110 are updated based on the current context to display context-specific actions or navigations that are available based on the current selection and location within the user interface flow. As disclosed above, the actions and navigations identified by the hotkeys and keyboard shortcuts 1110 may be initiated by any suitable user input 502, according to particular needs. Embodiments contemplate automatically initiating a recommended action or navigation without receiving user input 502. The interface system may automatically initiate an action or navigation when, for example, a confidence score is higher than a predefined threshold, or when the action or navigation is required by current guided task navigation 2100. Embodiments further contemplate providing a time period in which the action or navigation is undone or not executed based on receiving a suitable user input 502.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for predicting recommendations for a user interface, comprising:
   a computer, comprising a processor and memory, and configured to:
      generate a graphical user interface that receives a conversation-based input from at least one user of a client portal;
      receive a user profile and a navigation history for the at least one user;
      provide the conversation-based input from the at least one user to a natural language processing engine;
      decode, by the natural language processing engine, an intent and one or more slots from the conversation-based input, wherein the intent is determined according to meta-classes to be low-complexity or high-complexity, wherein the meta-classes comprise one or more of: recognize, enter, initiate, overview and select;
      generate a plurality of ranked recommendations based, at least in part, on the intent, the one or more slots, the user profile, and the navigation history, wherein the plurality of ranked recommendations are generated using a probabilistic matrix factorization, wherein plurality of ranked recommendations comprise navigational flows between levels of a hierarchy of nodes and arcs which correspond to organization of the graphical user interface, wherein each node of the hierarchy of nodes corresponds to data locations, functions, actions, layouts, screens, and modules which a user may view to perform related tasks, and further wherein the plurality of ranked recommendations comprise tasks of a functional workflow;
      monitor actual actions and navigation initiated by the at least one user to determine correct and incorrect recommendations; and
      based on the monitoring, update a learning model to improve future recommendations and their rankings.

2. The system of claim 1, wherein the one or more recommendations comprise a subsequent action for the at least one user to complete at least one task, a quantity of remaining steps to complete the at least one task, and an identification of any slots and entities needed to complete the quantity of remaining steps.

3. The system of claim 1, wherein the one or more recommendations are ranked according to a confidence score.

4. The system of claim 1, wherein the decoded intent is a categorical assignment that describes a purpose or goal of the conversation-based input.

5. The system of claim 1, wherein the computer is configured to generate the one or more recommendations by:

crawling tasks associated with the at least one user;

indexing the crawled tasks by storing and organizing task definitions according to one or more intents that initiate a task; and ranking the crawled tasks to identify tasks most relevant to the decoded intent.

6. A computer-implemented method for predicting recommendations for a user interface, comprising:

generating, by a computer comprising a processor and memory, a graphical user interface that receives a conversation-based input from at least one user of a client portal;

receiving, by the computer, a user profile and a navigation history for the at least one user, providing, by the computer, the conversation-based input from the at least one user to a natural language processing engine;

decoding, by the computer using the natural language processing engine, an intent and one or more slots from the conversation-based input, wherein the intent is determined according to meta-classes to be low-complexity or high-complexity, wherein the meta-classes comprise one or more of: recognize, enter, initiate, overview and select;

generating, by the computer, a plurality of ranked recommendations based, at least in part, on the intent, the one or more slots, the user profile, and the navigation history, wherein the a plurality of ranked recommendations are generated using a probabilistic matrix factorization, wherein plurality of ranked recommendations comprise navigational flows between levels of a hierarchy of nodes and arcs which correspond to organization of the graphical user interface, wherein each node of the hierarchy of nodes corresponds to data locations, functions, actions, layouts, screens, and modules which a user may view to perform related tasks, and further wherein plurality of ranked recommendations comprise tasks of a functional workflow;

monitoring, by the computer, actual actions and navigation initiated by the at least one user to determine correct and incorrect recommendations; and based on the monitoring, updating, by the computer, a learning model to improve future recommendations and their rankings.

7. The computer-implemented method of claim 6, wherein the one or more recommendations comprise a subsequent action for the at least one user to complete at least one task, a quantity of remaining steps to complete the at least one task, and an identification of any slots and entities needed to complete the quantity of remaining steps.

8. The computer-implemented method of claim 6, wherein the one or more recommendations are ranked according to a confidence score.

9. The computer-implemented method of claim 6, wherein the decoded intent is a categorical assignment that describes a purpose or goal of the conversation-based input.

10. The computer-implemented method of claim 6, further comprising generating the one or more recommendations by:

crawling, by the computer, tasks associated with the at least one user;

indexing, by the computer, the crawled tasks by storing and organizing task definitions according to one or more intents that initiate a task; and ranking, by the computer, the crawled tasks to identify tasks most relevant to the decoded intent.

11. A non-transitory computer-readable storage medium embodied with software for predicting recommendations for a user interface, the software when executed by a computer is configured to:

generate a graphical user interface that receives a conversation-based input from at least one user of a client portal;

receive a user profile and a navigation history for the at least one user;

provide the conversation-based input from the at least one user to a natural language processing engine;

decode, by the natural language processing engine, an intent and one or more slots from the conversation-based input, wherein the intent is determined according to meta-classes to be low-complexity or high-complexity, wherein the meta-classes comprise one or more of: recognize, enter, initiate, overview and select;

generate a plurality of ranked recommendations based, at least in part, on the intent, the one or more slots, the user profile, and the navigation history, wherein the plurality of ranked recommendations are generated using a probabilistic matrix factorization, wherein the plurality of ranked recommendations comprise navigational flows between levels of a hierarchy of nodes and arcs which correspond to organization of the graphical user interface, wherein each node of the hierarchy of nodes corresponds to data locations, functions, actions, layouts, screens, and modules which a user may view to perform related tasks, and further wherein the plurality of ranked recommendations comprise tasks of a functional workflow;

monitor actual actions and navigation initiated by the at least one user to determine correct and incorrect recommendations; and based on the monitoring, update a learning model to improve future recommendations and their rankings.

12. The non-transitory computer-readable storage medium of claim 11, wherein the one or more recommendations comprise a subsequent action for the at least one user to complete at least one task, a quantity of remaining steps to complete the at least one task, and an identification of any slots and entities needed to complete the quantity of remaining steps.

13. The non-transitory computer-readable storage medium of claim 11, wherein the one or more recommendations are ranked according to a confidence score.

14. The non-transitory computer-readable storage medium of claim 11, wherein the decoded intent is a categorical assignment that describes a purpose or goal of the conversation-based input.

15. The non-transitory computer-readable storage medium of claim 11, wherein the software is configured to generate the one or more recommendations by:

crawl tasks associated with the at least one user;

index the crawled tasks by storing and organizing task definitions according to one or more intents that initiate a task; and rank the crawled tasks to identify tasks most relevant to the decoded intent.

* * * * *